US008825659B2

(12) United States Patent
Nishimura et al.

(10) Patent No.: US 8,825,659 B2
(45) Date of Patent: Sep. 2, 2014

(54) GAME APPARATUS, GAME DATA DELIVERY SYSTEM, AND STORAGE MEDIUM FOR USE WITH HITTING COUNT RELATED GAME, AND/OR ASSOCIATED METHODS

(75) Inventors: Kentaro Nishimura, Kyoto (JP); Yoichi Yui, Fujisawa (JP); Akihiro Kayama, Fujisawa (JP)

(73) Assignee: Nintendo Co., Ltd., Kyoto (JP)

( * ) Notice: Subject to any disclaimer, the term of this patent is extended or adjusted under 35 U.S.C. 154(b) by 964 days.

(21) Appl. No.: 12/240,056

(22) Filed: Sep. 29, 2008

(65) Prior Publication Data

US 2009/0305759 A1 Dec. 10, 2009

(30) Foreign Application Priority Data

Jun. 10, 2008 (JP) ................................. 2008-151237

(51) Int. Cl.
| G06F 7/00 | (2006.01) |
| G06F 17/30 | (2006.01) |
| G06F 17/00 | (2006.01) |
| G06F 19/00 | (2011.01) |
| A63F 9/24 | (2006.01) |
| A63F 13/00 | (2014.01) |

(52) U.S. Cl.
CPC .......... *A63F 13/00* (2013.01); *G06F 17/30634* (2013.01); *A63F 2300/513* (2013.01); *A63F 2300/6018* (2013.01); *A63F 2300/8064* (2013.01); *Y10S 707/912* (2013.01)
USPC .............. 707/741; 707/769; 707/912; 463/9; 463/42

(58) Field of Classification Search
CPC ............ A63F 13/12; A63F 2300/8064; A63F 2300/8094

USPC ......... 707/705, 706, 722, 736, 741, 758, 769, 707/912; 463/1, 9, 40, 41, 42
See application file for complete search history.

(56) References Cited

U.S. PATENT DOCUMENTS 6,254,099 B1 * 7/2001 Pederson ...................... 273/292
6,532,469 B1 * 3/2003 Feldman et al. .............. 707/750
(Continued)

FOREIGN PATENT DOCUMENTS

| JP | 2002-351894 | 12/2002 |
| JP | 2003-000949 | 1/2003 |
| JP | 2006-139484 | 6/2006 |

OTHER PUBLICATIONS

"Googlewhack" Japan Helper 1.0.2 in Mac People, vol. 8, No. 18, Published by ASCII Corporation on Sep. 15, 2002, p. 76 (with partial English translation).
Notification of Reason(s) for Refusal mailed Jun. 5, 2013 in Japanese Application No. 2008-151237, with English Translation (6 pages).

(Continued)

*Primary Examiner* — Marc Somers
(74) *Attorney, Agent, or Firm* — Nixon & Vanderhye, P.C.

(57) ABSTRACT

A game apparatus includes a CPU, and the CPU executes game processing of a virtual game. The game program and the game data are read from an optical disk into a main memory of the game apparatus. During execution of the game processing, a single-search hitting count obtained in a case that a predetermined database is searched by a word selected by the player is read from the game data, or an AND search hitting count obtained in a case that the database is searched by a word selected by the player and a word set in advance is read from the game data. The game apparatus progresses the game processing on the basis of the read single-search hitting count and AND search hitting count.

18 Claims, 15 Drawing Sheets

(56) References Cited

U.S. PATENT DOCUMENTS

| | | | |
|---|---|---|---|
| 7,192,283 B2* | 3/2007 | Paley | 434/178 |
| 7,917,496 B2* | 3/2011 | King | 707/713 |
| 7,980,930 B2* | 7/2011 | Moreno | 463/9 |
| 2004/0088308 A1* | 5/2004 | Bailey et al. | 707/100 |
| 2008/0113801 A1* | 5/2008 | Moreno | 463/40 |

OTHER PUBLICATIONS

[Junk no Hanazono presents all that's Yahoo! search] Buffalo Goro held talks featuring Yahoo! "Rasugo," a game for the Wii, was also introduced. [online] posted on BB Watch by Impress Watch Corporation on Jun. 18, 2007 [searched on May 29, 2013], Internet (with partial English translation); URL: http://bb.watch.impress.co.jp/cdalevent/18492.html (6 pages).

* cited by examiner (A) GAME SCREEN 300

(B) HAND SELECTION SCREEN 320

FIG. 14

(A) WORD DATA  510

| WORD ID | 1 | 2 | 3 | ... | n |
|---|---|---|---|---|---|
| WORD TEXT STRING | aaa | bbb | ccc | ... | nnn |
| SINGLE SEARCH HITTING COUNT | $X_1$ | $X_2$ | $X_3$ | ... | $X_n$ |
| ATTRIBUTE | $Z_1$ | $Z_2$ | $Z_3$ | ... | $Z_n$ |

(B) AND SEARCH HITTING COUNT DATA  512

| WORD ID | 1 | 2 | 3 | 4 | ... | n |
|---|---|---|---|---|---|---|
| 1 | | $Y_{12}$ | $Y_{13}$ | $Y_{14}$ | ... | $Y_{1n}$ |
| 2 | — | | $Y_{23}$ | $Y_{24}$ | ... | $Y_{2n}$ |
| 3 | — | — | | $Y_{34}$ | ... | $Y_{3n}$ |
| 4 | — | — | — | | ... | $Y_{4n}$ |
| ⋮ | ⋮ | ⋮ | ⋮ | ⋮ | | ⋮ |
| n | — | — | — | — | ... | |

GAME APPARATUS, GAME DATA DELIVERY SYSTEM, AND STORAGE MEDIUM FOR USE WITH HITTING COUNT RELATED GAME, AND/OR ASSOCIATED METHODS

CROSS REFERENCE OF RELATED APPLICATION

The disclosure of Japanese Patent Application No. 2008-151237 is incorporated herein by reference.

TECHNICAL FIELD

The present invention relates to a game apparatus, a game data delivery system and a storage medium. More specifically, the present invention relates to a game apparatus, a game data delivery system and a storage medium which perform a game on the basis of a hitting count by search through a predetermined database by a word.

BACKGROUND AND SUMMARY

As one example of this kind of a conventional game apparatus, there is one which aims for a predetermined hitting count in an on-line search system.

However, since an on-line search system via the Internet is used in the conventional game, it is impossible to play the game which aims for a predetermined hitting count under the environment where a game apparatus is not connected to the Internet. Furthermore, since a hitting count is acquired in real time by using the on-line search system, it takes much time to acquire the search result. Thus, it is impossible to progress the game smoothly, which may cause an unnecessary stress to the player.

Therefore, it is an aspect of certain example embodiments of the present invention to provide a novel game apparatus, game data delivery system and storage medium.

Another aspect of certain example embodiments of the present invention is to provide a game apparatus, a game data delivery system and a storage medium capable of playing a game even offline in a search hitting count game.

Still another aspect of certain example embodiments of the present invention is to provide a game apparatus, a game data delivery system and a storage medium capable of speeding up responses without actually performing a search in the search hitting count game.

Certain example embodiments of the present invention employ following features in order to solve the above-described problems. It should be noted that reference numerals inside the parentheses and the supplements show one example of a corresponding relationship with the embodiments described later for easy understanding of the embodiments, and do not limit the present invention.

A first invention is a game apparatus for performing a game on the basis of a hitting count obtained by searching through a predetermined database by at least one word, and comprises a hitting count storing means, a selecting means, and a game processing means. The hitting count storing means stores together with word data of a plurality of words to be used in the game, hitting count data including at least one of a single-search hitting count indicating a hitting count obtained by searching through database by each of the word, and an AND search hitting count indicating a hitting count obtained by searching through the database by a combined use of the two words out of the plurality of words. The selecting means causes a user to select at least one word. The game processing means performs reading of the hitting count data from the hitting count storing means on the basis of the word selection in the selecting means, and performs game processing on the basis of the hitting count indicated by the hitting count data.

In the first invention, the game apparatus (12) performs a game on the basis of the hitting count by searching through a predetermined database (602a) by a word. A hitting count storing means (502) stores hitting count data (502b) together with word data (510) of a plurality of words to be used in the game. The hitting count data includes at least one of a single-search hitting count (510) indicating a hitting count obtained by searching through the database by each of the word, and an AND search hitting count (512) indicating a hitting count obtained by searching through the database by a combined use of the two words out of the plurality of words. A selecting means (40, S9) causes a user to select at least one word. A game processing means (40, S19) performs reading of the hitting count data from the hitting count storing means on the basis of the word selection in the selecting means (S13,S17), and performs game processing on the basis of the hitting count indicated by the hitting count data. That is, the game processing based on the single-search hitting count data or the AND search hitting count data is executed.

According to the first invention, since the stored hitting count data is read to thereby execute the game processing, it is possible to play the game on the basis of the searched hitting count without the game apparatus being connected to a network such as the Internet. Furthermore, the stored hitting count data is merely read, to eliminate a need of actually executing the search processing, which realizes responses at high speed. Thus, it is possible to progress the game smoothly.

A second invention is a game apparatus in which the game processing means sets a time limit for the word selection by the user, and executes the game processing on the basis of the hitting count in relation to the word selected within the time limit.

In the second invention, the game processing means sets a time limit for the word selection by the user, and executes the game processing on the basis of the hitting count in relation to the word selected within the time limit. For example, in a case that the hitting count in relation to the word selected within the time limit satisfies a predetermined condition, the time limit is set anew to progress the game, and in a case that the hitting count in relation to the word selected within the time limit does not satisfy the predetermined condition, the game is made over.

According to the second invention, since the stored hitting count data is merely read, it is possible to neglect the time taken for the search processing of the hitting count, which allows a rule such as setting a time limit.

A third invention is dependent on the first invention, and the selecting means causes each of the plurality of users to select the word, and the game processing means reads AND search hitting counts of the combination between a predetermined word presented in advance and the words selected by the respective users, compares them, and executes game processing according to the comparison result.

In the third invention, the selecting means causes each of the plurality of users to select the word. The game processing means reads AND search hitting counts of the combinations between a predetermined word presented in advance and the words selected by the respective users. Then, the game processing means compares the read AND search hitting counts, and executes game processing corresponding to the comparison result. For example, the game processing means applies a high score to the player which has the most AND search hitting count.

According to the third invention, since the stored hitting count data is merely read, it is possible to acquire the hitting counts of the plurality of players at a time, and progress the game on the basis thereof. Moreover, the time for the search processing is less, capable of progressing the game smoothly.

A fourth invention is dependent on the first invention, and the game processing means determines whether or not the user arranges a plurality of words in the order of the hitting counts, and executes the game processing according to the determination result.

In the fourth invention, the game processing means determines whether or not the user arranges the plurality of words in the order of the hitting count. For example, the words are arranged in the order of increasing or decreasing the single-search hitting count, or the words are arranged in the order of increasing or decreasing order of the AND search hitting count with the words decided in advance. Then, the game processing means executes game processing according to the determination result. For example, in a case that the words are arranged according to the order, game processing representing a correct answer (success) is executed. Furthermore, in a case that the words are arranged without complying with the order, game processing representing a incorrect answer (failure) is executed.

According to the fourth invention, it is possible to play the game on the basis of the magnitude of the hitting count.

A fifth invention comprises a search server, a delivery server, and at least one game apparatus for performing a game on the basis of a hitting count obtained by searching through a predetermined database by at least one word. The delivery server includes a hitting count acquiring means for acquiring a hitting count of the word from the search server via a network, a delivery data storing means for producing data of the hitting count from the acquired hitting count and storing it, and a delivering means for delivering the hitting count data stored in the delivery data storing means to the game apparatus via the network. The game apparatus includes a hitting count storing means for storing, together with word data of a plurality of words to be used in the game, hitting count data including at least one of a single-search hitting count indicating a hitting count obtained by searching through the database by each of the word, and an AND search hitting count indicating a hitting count obtained by searching through the database by a combined use of the two words out of the plurality of words, a selecting means for causing a user to select at least one word, and a game processing means for performing reading of the hitting count data from the hitting count storing means on the basis of the word selection in the selecting means, and performing game processing on the basis of the hitting count indicated by the hitting count data, and the hitting count data delivered from the delivering means is acquired so as to be stored in the hitting count storing means.

In the fifth invention, the game data delivery system (600) comprises a search server (602), a delivery server (604), and at least one game apparatus (12). The game apparatus is the game apparatus shown in any one of the first to fourth inventions, for example. In the delivery server, a hitting count acquiring means acquires a hitting count of the word from the search server via a network (606). Here, the search server and the delivery server may directly be connected to acquire a hitting count of a word without passing through the network. A delivery data storing means produces hitting count data (502*b* (510, 512)) from the acquired hitting count and stores it. A delivering means delivers the hitting count data stored ill the delivery data storing means to the game apparatus via the network. The game apparatus acquires the hitting count data delivered from the delivering means, and stores it in the hitting count storing means. That is, the hitting count data is stored or updated.

According to the fifth invention, since the delivery server delivers the hitting count data to the game apparatus, the game apparatus never accesses the search server. Thus, it is possible to prevent too much access to the search server and heavy traffic.

A sixth invention is a storage medium storing a game program. A game apparatus for performing a game on the basis of a hitting count obtained by searching through a predetermined database by at least one word comprises a hitting count storing means for storing, together with word data of a plurality of words to be used in the game, hitting count data including at least one of a single-search hitting count indicating a hitting count obtained by searching through database by each of the word, and an AND search hitting count indicating a hitting count obtained by searching through the database by a combined use of the two words out of the plurality of words. The game program causes a computer of the game apparatus to function as a selecting means for causing a user to select at least one word, and a game processing means for performing reading the hitting count data from the hitting count storing means on the basis of the word selection in the selecting means, and performing game processing on the basis of the hitting count indicated by the hitting count data.

In also the sixth invention, similar to the first invention, it is possible to play a game on the basis of the searched hitting count without the game apparatus being connected to a network such as the Internet.

A seventh invention is dependent on the sixth invention, and the game processing means sets a time limit for the word selection by the user, and executes the game processing on the basis of the hitting count in relation to the word selected within the time limit.

In the seventh invention also, similar to the second invention, it is possible to set a rule, such as setting a time limit.

An eighth invention is dependent on the sixth invention, and the selecting means causes each of the plurality of users to select the word, and the game processing means reads AND search hitting counts between a predetermined word presented in advance and the words selected by the respective users, compares them, and executes game processing according to the comparison result.

In also the eighth invention, similar to the third invention, since the stored hitting count data is merely read, it is possible to acquire the hitting counts of the plurality of players at a time, and progress the came on the basis thereof.

A ninth invention is dependent on the sixth invention, and the game processing means determines whether or not the user arranges a plurality of words in the order of the hitting counts, and executes the game processing according to the determination result.

In also the ninth invention, similar to the fourth invention, it is possible to play a game on the basis of the magnitude of the hitting count.

A tenth invention is a storage medium storing data to be used in the game apparatus. The game apparatus performs a game on the basis of a hitting count obtained by searching through a predetermined database by a word. The storage medium stores hitting count data including at least one of a single-search hitting count indicating a hitting count obtained by searching through the database by each of the word, and an AND search hitting count indicating a hitting count obtained by searching through the database by a combined use of the two words.

In the tenth invention, a storage medium (18, 42e, 44, 46) stores data to be used in the game apparatus (12) which performs a game on the basis of a hitting count by searching through the predetermined database (602a) by at least one word. More specifically, the storage medium stores hitting count data including at least one of a single-search hitting count indicating a hitting count obtained by searching through the database by each of the word, and an AND search hitting count indicating a hitting count obtained by searching through the database by a combined use of the two words are stored.

According to the tenth invention, by executing the game by means of the storage medium, it is possible to play a game on the basis of the searched hitting count even if the game apparatus is not connected to a network such as the Internet. Furthermore, since the hitting count data actually stored in the storage medium is merely read, the search processing is not required to be actually executed, which makes the speed of the responses of the game high. Accordingly, it is possible to progress the game smoothly.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 14 is an illustrative view showing a detailed content of the word hitting count data shown in FIG. 13;

DETAILED DESCRIPTION OF THE PREFERRED EMBODIMENTS

Figure 1:
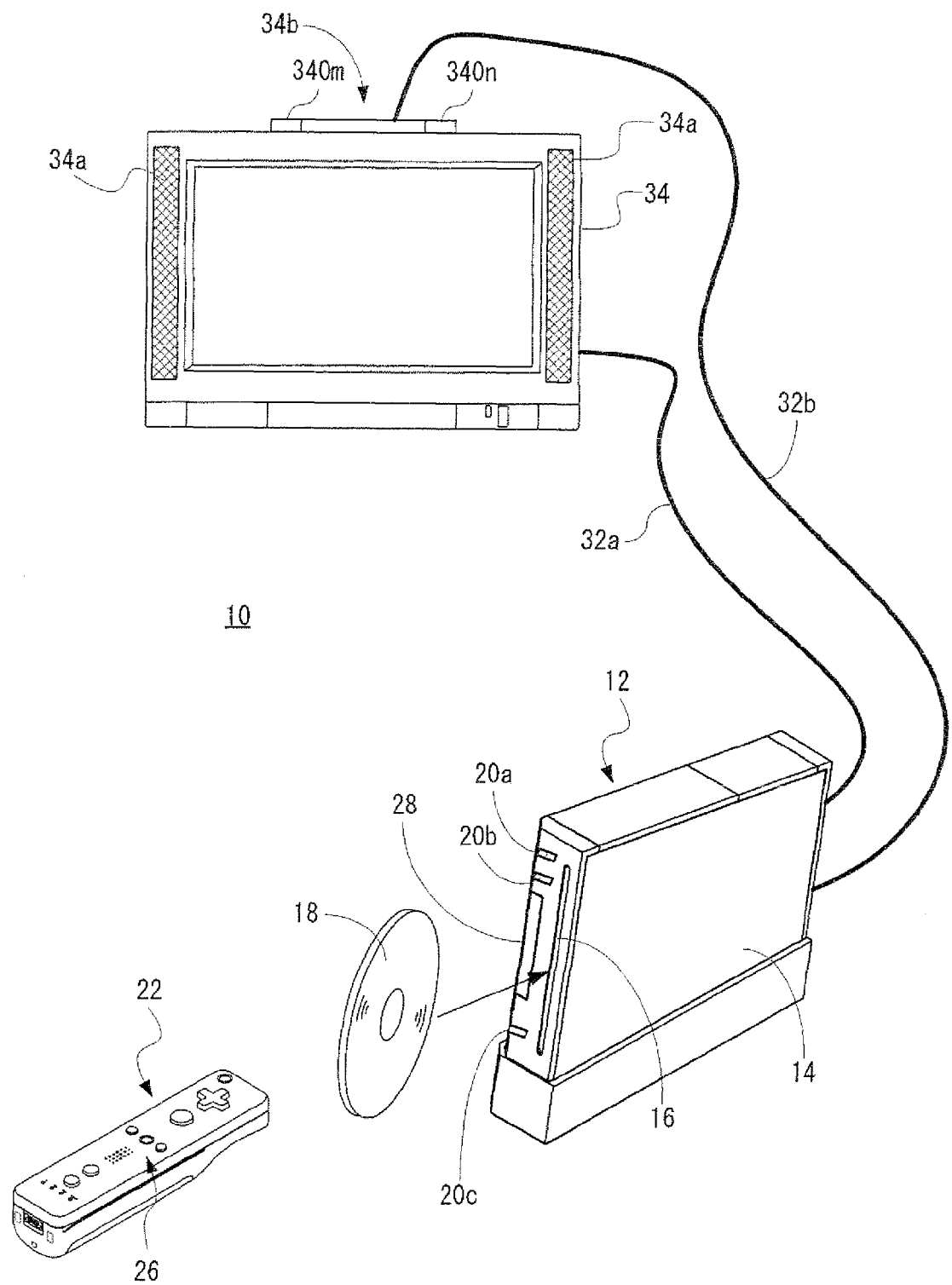
FIG. 1 is an illustrative view showing one embodiment of a game system of the present invention.

Referring to FIG. 1, a game system 10 of one embodiment of the present invention includes a video game apparatus (hereinafter referred to as a "game apparatus") 12 functioning as an information processing apparatus and a controller 22. Although illustration is omitted, the game apparatus 12 of this embodiment is designed such that it can be connected to four controllers 22 at the maximum. Furthermore, the game apparatus 12 and the respective controllers 22 are connected by radio. The wireless communication is executed according to a BLUETOOTH (registered trademark) standard, for example, but may be executed by other standards such as infrared rays, a wireless LAN. In addition, it may be connected by a wire.

The game apparatus 12 includes a roughly rectangular parallelepiped housing 14, and the housing 14 is furnished with a disk slot 16 on a front surface. An optical disk 18 as one example of an information storage medium storing game program, etc. is inserted from the disk slot 16 to be loaded into a disk drive 54 (see FIG. 2) within the housing 14. Although illustration is omitted, around the disk slot 16, an LED and a light guide plate are arranged such that the LED of the disk slot 16 can light on or off in accordance with various processing.

Furthermore, on the front surface of the housing 14 of the game apparatus 12, a power button 20a and a reset button 20b are provided at the upper part thereof, and an eject button 20c is provided below them. In addition, a connector cover for external memory card 28 is provided between the reset button 20b and the eject button 20c, and in the vicinity of the disk slot 16. Inside the connector cover for external memory card 28, an external connector for memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory of the internal memory. In addition, in the game apparatus 12, other application except for the game may be executed, and in such a case, data of the other application can be stored in the memory card.

Here, a general-purpose SD card can be employed as a memory card, but other general-purpose memory cards, such as memory sticks, multimedia cards (registered trademark) can be employed.

Although omitted in FIG. 1, the game apparatus 12 has an AV cable connector 58 (FIG. 2) on the rear surface of the housing 14, and by utilizing the AV cable connector 58, a monitor 34 and a speaker 34a are connected to the game apparatus 12 through an AV cable 32a. The monitor 34 and the speaker 34a typically are a color television receiver, and through the AV cable 32a, a video signal from the game apparatus 12 is input to a video input terminal of the color television, and a sound signal is input to a sound input terminal. Accordingly, a game image of a three-dimensional (3D) video game, for example, is displayed on the screen of the color television (monitor) 34, and stereo game sound, such as a game music, a sound effect, etc. is output from the right and left speakers 34a. Around the monitor 34 (on the top side of the monitor 34, in this embodiment), a marker unit 34b including two infrared ray LEDs (markers) 34m and 34n is provided. The marker unit 34b is connected to the game apparatus 12 through a power source cable 32b. Accordingly, the marker unit 34b is supplied with power from the game apparatus 12. Thus, the markers 34m and 34n emit lights toward front of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the input means 26, a game or other application is started. Besides the operation of the input means 26, by moving the controller 22 itself, it is possible to move a moving image object (player object) in different directions or change a perspective of the user (camera position) in a 3-dimensional game world.

Here, programs of the video game and other applications may be stored (installed) in an internal memory (flash memory 42 (see FIG. 2)) of the game apparatus 12 so as to be executed from the internal memory. In such a case, programs stored in a storage medium like an optical disk 18 may be installed onto the internal memory, or the downloaded program may be installed onto the internal memory.

Figure 2:
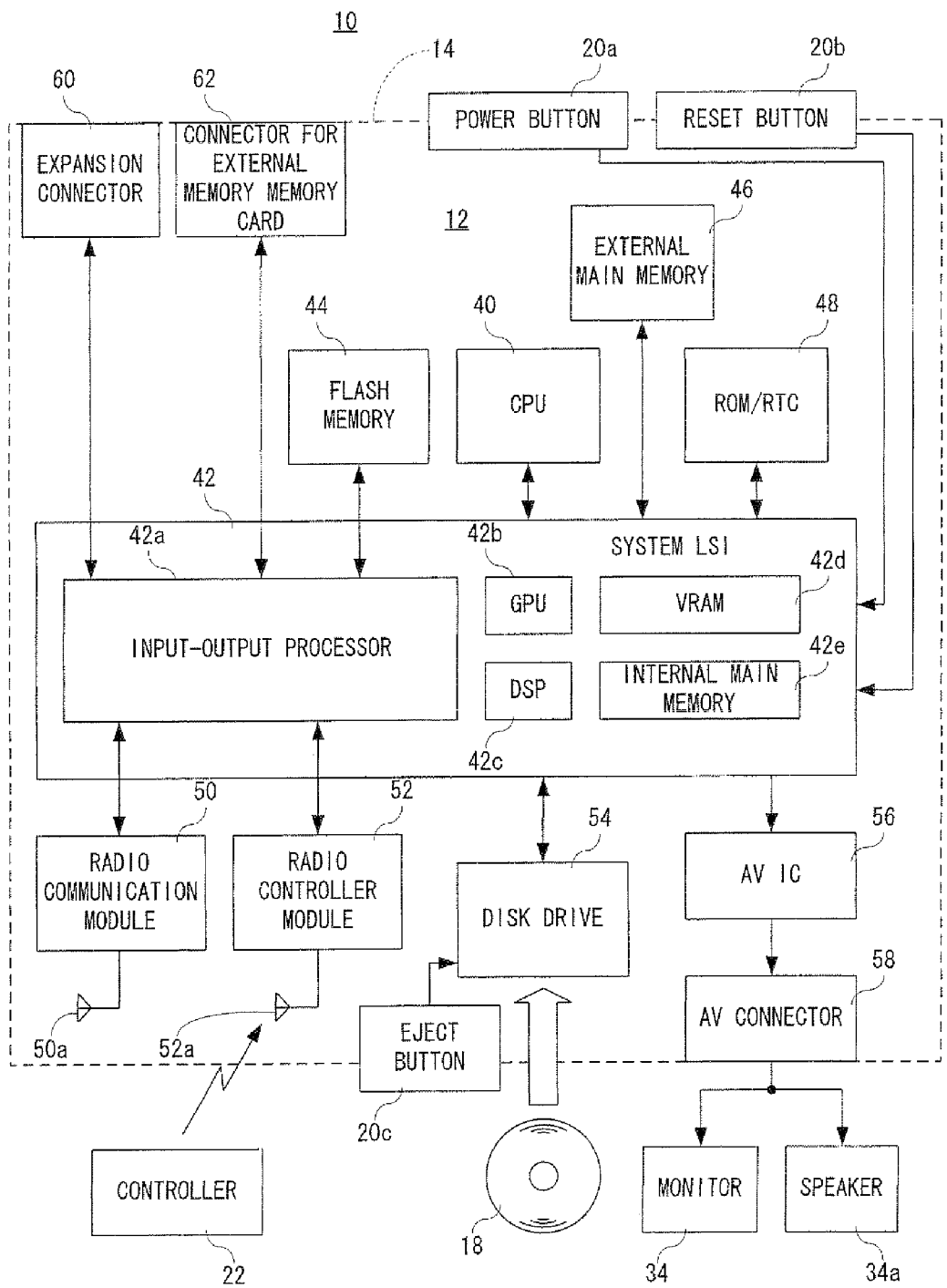
FIG. 2 is a block diagram showing an electric configuration of a game system shown in FIG. 1.

FIG. 2 is a block diagram showing an electric configuration of the video game system 10 in the FIG. 1 embodiment. Although illustration is omitted, the respective components within the housing 14 are contained on a printed board. As shown in FIG. 2, the game apparatus 12 has a CPU 40. The CPU 40 functions as a game processor. The CPU 40 is connected to a system large-scale integrator (LSI) 42. The system LSI 42 is connected with an external main memory 46, a read only memory/real time clock (ROM/RTC) 48, a disk drive 54, and an audiovisual integrated circuit (AV) IC 56.

The external main memory 46 is utilized as a work area and a buffer area of the CPU 40 by storing programs like a game program, etc., various data. The ROM/RTC 48, the so-called boot ROM, is incorporated with a program for activating the game apparatus 12, and provided with a time circuit for counting a time. The disk drive 54 reads a program, image data, sound data, etc. from the optical disk 18, and writes them in an internal main memory 42e described later or the external main memory 46 under the control of the CPU 40.

The system LSI 42 is provided with an input-output processor 42a, a CPU (Graphics Processor Unit) 42b, a DSP (Digital Signal Processor) 42c, a VRAM 42d and an internal main memory 42e. These are connected with each other by internal buses although illustration is omitted. The input-output processor (I/O processor) 42a executes transmission and reception of data, downloads of data, and so forth. A detailed description is made later as to transmission and reception and download of the data.

The GPU 42b is made up of a part of a rendering means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire the data (image data: data such as polygon data, texture data, etc.) required to execute the construction command. Additionally, the CPU 40 writes the image data required for drawing to the VRAM 42d via the CPU 42b. The GPU 42b accesses the VRAM 42d to create game image data for drawing.

In this embodiment, a description is made on a case that the CPU 42b generates game image data, but in a case of executing an arbitrary application except for the game application, the GPU 42b generates image data as to the arbitrary application.

Furthermore, the DSP 42c functions as an audio processor, and generates audio data corresponding to a sound, a voice, music, or the like by means of the sound data and the sound wave (tone) data stored in the internal main memory 42e and the external main memory 46.

The game image data and audio data generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with a flash memory 44, a radio communication module 50, a radio controller module 52, an expansion connector 60 and a connector for memory card 62. The radio communication module 50 is connected with an antenna 50a, and the radio controller module 52 is connected with an antenna 52a.

Although illustration is omitted, the input-output processor 42a can communicate with other game apparatuses and various servers to be connected to a network via the radio communication module 50. It should be noted that it is possible to directly communicate with other game apparatuses without going through the network. The input-output processor 42a periodically accesses the flash memory 44 to detect the presence or absence of data (referred to as transmission data) required to be transmitted to a network, and, in a case that the transmission data is present, transmits it to the network via the radio communication module 50 and the antenna 50a. Furthermore, the input-output processor 42a receives data (referred to as reception data) transmitted from other game apparatuses via the network, the antenna 50a and the radio communication module 50, and stores the reception data in the flash memory 44. If the reception data does not satisfy a predetermined condition, the reception data is abandoned as it is. In addition, the input-output processor 42a receives data (download data) downloaded from the download server via the network, the antenna 50a and the radio communication module 50, and stores the download data in the flash memory 44.

Furthermore, the input-output processor 42a receives input data transmitted from the controller 22 via the antenna 52a and the radio controller module 52, and (temporarily) stores it in the buffer area of the internal main memory 42e or the external main memory 46. The input data is erased from the buffer area after being utilized in the processing by the CPU 40 (game processing, for example).

In this embodiment, as described above, the radio controller module 52 performs communication with the controller 22 in accordance with BLUETOOTH (trademark) standards.

In addition, the input-output processor 42a is connected with the expansion connector 60 and the connector for memory card 62. The expansion connector 60 is a connector for interfaces, such as USB, SCSI, etc., and can be connected with medium such as an external storage, and peripheral devices such as another controller. Furthermore, the expansion connector 60 is connected with a cable LAN adaptor, and can utilize the cable LAN in place of the radio communication module 50. The connector for memory card 62 can be connected with an external storage like a memory card. Thus, for example, the input-output processor 42a accesses the external storage via the expansion connector 60 and the connector for memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 set in a mode of a normal energized state in which the respective components of the game apparatus 12 are supplied with power through an AC adapter not shown (referred to as "normal mode"). On the other hand, when the power button 20a is turned off, the system LSI 42 is set to a mode in which only a part of the components of the game apparatus 12 is supplied with power, and the power consumption is reduced to minimum (hereinafter referred to as a "standby mode").

In this embodiment, in a case that the standby mode is set, the system LSI 42 issues an instruction to stop supplying the power to the components except for the input-output processor 42a, the flash memory 44, the external main memory 46, the ROM/RTC 48 and the radio communication module 50, and the radio controller module 52. Accordingly, in this embodiment, in the standby mode, the CPU 40 never performs an application.

Although the system LSI 42 is supplied with power even in the standby mode, generation of clocks to the GPU 42b, the DSP 42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that utilizing the standby mode is not desired, by making the standby mode unusable, when the power button 20a is turned off, the power supply to all the circuit components are completely stopped.

Furthermore, switching between the normal mode and the standby mode can be performed by turning on and off the power switch 26h of the controller 22 by remote control. If the remote control is not performed, setting is made such that the power supply to the radio controller module 52a is not performed in the standby mode.

The reset button 20b is also connected with the system LSI 42. When the reset button 20b is pushed, the system LSI 42 restarts the activation program of the game apparatus 12. The eject button 20c is connected to the disk drive 54. When the eject button 20c is pushed, the optical disk 18 is removed from the disk drive 54.

Figure 3:
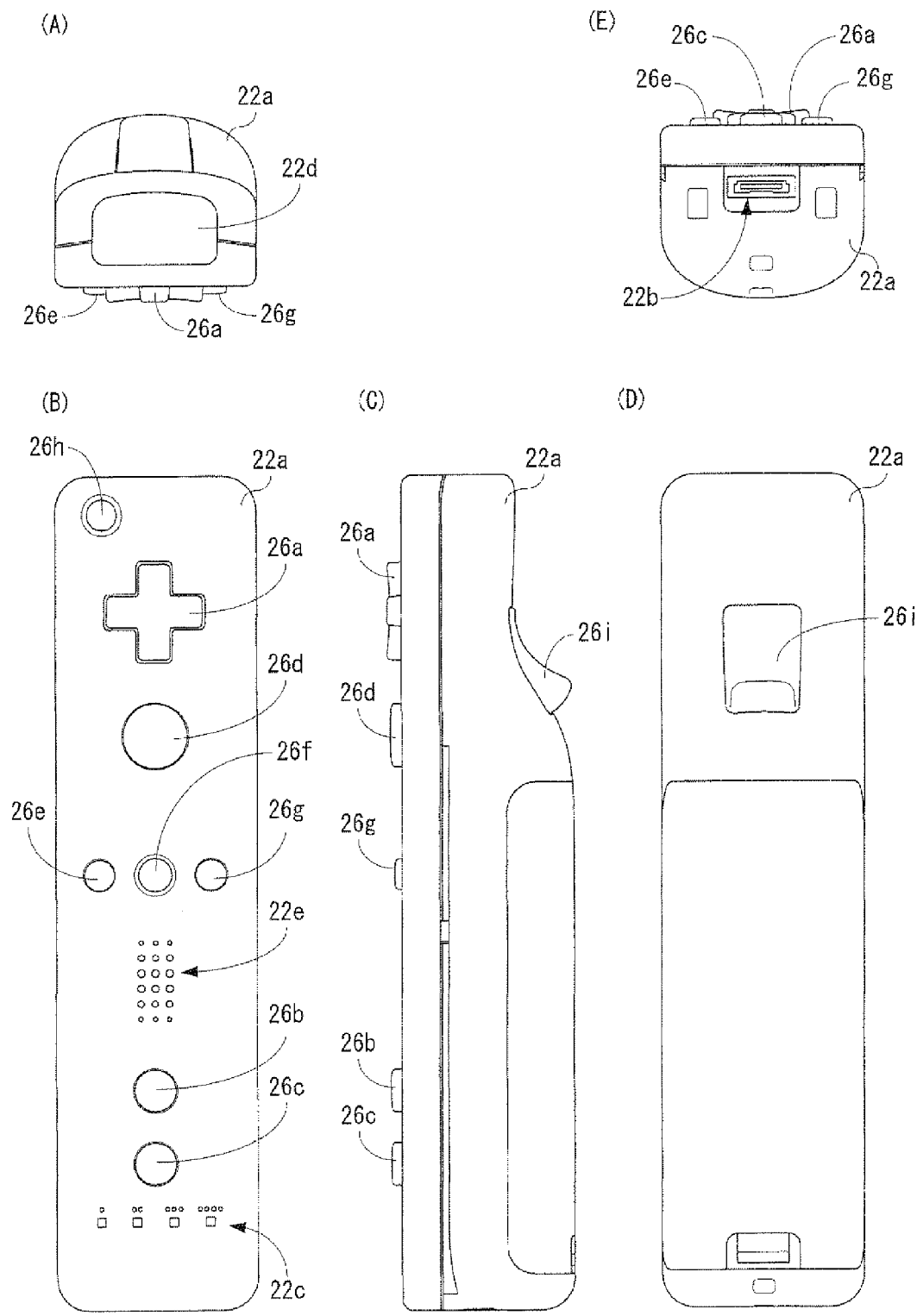
FIG. 3 is an illustrative view explaining an appearance of the controller shown in FIG. 1.

Each of FIG. 3(A) to FIG. 3(E) shows one example of an external appearance of the controller 22. FIG. 3(A) shows a front end surface of the controller 22, FIG. 3(B) shows a top surface of the controller 22, FIG. 3(C) shows a right side surface of the controller 22, FIG. 3(D) shows a lower surface of the controller 22, and FIG. 3(E) shows a back end surface of the controller 22.

Referring to FIG. 3(A) and FIG. 3(E), the controller 22 has a housing 22a formed by plastic molding, for example. The housing 22a is formed into an approximately rectangular parallelepiped shape and has a size small enough to be held by one hand of a user. The housing 22a (controller 22) is provided with the input means (a plurality of buttons or switches) 26. Specifically, as shown in FIG. 3(B), on an upper surface of the housing 22a, there are provided a cross key 26a, a 1 button 26b, a 2 button 26c, an A button 26d, a − button 26e, a HOME button 26f, a + button 26g and a power switch 26h. Moreover, as shown in FIG. 3(C) and FIG. 3(D), an inclined surface is formed on a lower surface of the housing 22a, and a B-trigger switch 26i is formed on the inclined surface.

The cross key 26a is a four directional push switch, including four directions of front (or upper), back (or lower), right and left operation parts. By operating any one of the operation parts, it is possible to instruct a moving direction of a character or an object (player character or player object) that is operable by a player, instruct the moving direction of a cursor, or instruct the direction merely. In addition, in a case that a DVD is played in the game apparatus 12, and the controller 22 is used as a remote controller, with an operation of the left operating portion, it is possible to instruct fast reverse, and with an operation of the right operating portion, it is possible to instruct fast forward.

The 1 button 26b and the 2 button 26c are respectively push button switches, and are used for a game operation, such as adjusting a viewpoint position and a viewpoint direction on displaying the 3D game image, i.e. a position and al image angle of a virtual camera. Alternatively, the 1 button 26b and the 2 button 26c can be used for the same operation as that of the A-button 26d and the B-trigger switch 26i or an auxiliary operation.

The A-button switch 26d is the push button switch, and is used for causing the player character or the player object to take an action other than a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a role playing game (RPG) and a simulation RPG, it is possible to instruct to acquire an item, select and determine the weapon and command, and so forth. Furthermore, in a case that the controller 22 is used as a pointing device, the A-button switch 26d is used to instruct a decision of an icon or a button image instructed by a pointer (instruction image) on the game screen. For example, when the icon or the button image is decided, an instruction or a command set in advance corresponding thereto can be input. In addition, in a case that a DVD is played by the game apparatus 12, and the controller 22 is used as a remote controller, the A button switch 26d can instruct reproduction or pause.

The − button 26e, the HOME button 26f, the + button 26g, and the power supply switch 26h are also push button switches. The − button 26e is used for selecting a game mode. The HOME button 26f is used for displaying a game menu (menu screen). The + button 26g is used for starting (resuming) or pausing the game. The power supply switch 26h is used for turning on/off a power supply of the game apparatus 12 by remote control. Additionally, in a case that a DVD is played by the game apparatus 12, and the controller 22 is used as a remote controller, the − button 26e and the + button 26g are used to perform skipping (heading). More specifically, the − button 26e is used to reverse a chapter, and the + button 26g is used to forward a chapter.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for inputting a trigger such as shooting, and designating a position selected by the controller 22. In a case that the B-trigger switch 26i is continued to be pushed, it is possible to make movements and parameters of the player object constant. In a fixed case, the B-trigger switch 26i functions in the same way as a normal B-button, and is used for canceling the action and the command determined by the A-button 26d.

As shown in FIG. 3(E), an external expansion connector 22b is provided on a back end surface of the housing 22a, and as shown in FIG. 3(B), and an indicator 22c is provided on the top surface and on the side of the back end surface of the housing 22a. The external expansion connector 22b is utilized for connecting another expansion controller not shown other than the controller 22. The indicator 22c is made up of four LEDs, for example, and shows identification information (controller number) of the lighting controller 22 by lighting any one of the four LEDs, and shows the remaining amount of power of the controller 22 depending on the number of LEDs to be emitted.

In addition, the controller 22 has an imaged information arithmetic section 80 (see FIG. 4), and as shown in FIG. 3(A), on the front end surface of the housing 22a, light incident opening 22d of the image information arithmetic section 80 is provided. Furthermore, the controller 22 has a speaker 86 (see FIG. 4), and the speaker 86 is provided inside the housing 22a at the position corresponding to a sound release hole 22e between the 1 button 26b and the HOME button 26f on the tope surface of the housing 22a as shown in FIG. 3(B).

Note that as shown in FIG. 3(A) to FIG. 3(E), the shape of the controller 22 and the shape, number and setting position of each input means 26 are simply examples, and needless to say, even if they are suitably modified, the present invention can be realized.

Figure 4:
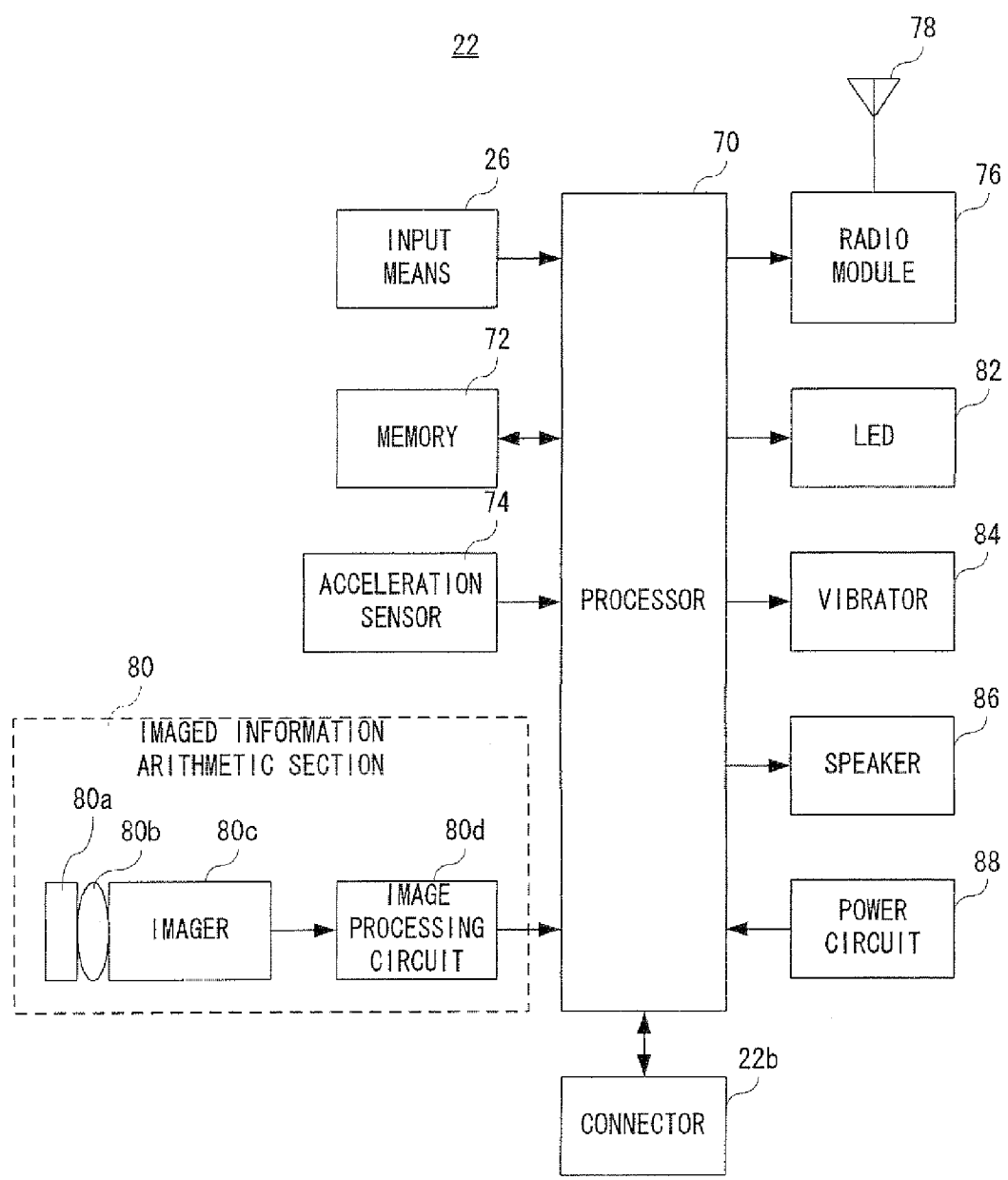
FIG. 4 is a block diagram showing an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a radio module 76, the imaged information arithmetic section 80, an LED 82 (the indicator 22c), a vibrator 84, a speaker 86, and a power supply circuit 88 by an internal bus (not shown). Moreover, an antenna 78 is connected to the radio module 76.

For simplicity, although omitted in FIG. 4, the indicator 22c is made up of the four LEDs 82 as described above.

The processor 70 is in charge of an overall control of the controller 22, and transmits (inputs) information (input information) input by the input means 26, the acceleration sensor 74, and the imaged information arithmetic section 80 as input data to the game apparatus 12 via the radio module 76 and the antenna 78. At this time, the processor 70 uses the memory 72 as a working area or a buffer area. An operation signal (operation data) from the aforementioned input means 26 (26a to 26i) is input to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected in the processor 70. For example, the acceleration sensor 74 detects the acceleration in each direction of the axes in a range from −2.0 g to 2.0 g (g indicates a gravitational acceleration. The same thing can be said hereafter.) The processor 70 detects the acceleration data given from the acceleration sensor 74 for each second predetermined time, and stores it in the memory 72 once.

The processor 70 creates input data including at least one of the operation data, acceleration data and marker coordinate data as described later, and transmits the input data thus created to the game apparatus 12 for each third predetermined time (5 msec, for example).

In this embodiment, although omitted in FIG. 3(A) to FIG. 3(E), the acceleration sensor 74 is provided inside the housing 22a and in the vicinity of the circuit board where the cross key 26a is arranged.

The radio module 76 modulates a carrier of a predetermined frequency by the input data, by using a technique of BLUETOOTH (trademark), for example, and emits its weak radio wave signal from the antenna 78. Namely, the input data is modulated to the weak radio wave signal by the radio module 76 and transmitted from the antenna 78 (controller 22). The weak radio wave signal thus transmitted is received by the radio controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs processing of the application (game processing), following the acquired input data and the application program (game program).

In addition, as described above, the controller 22 is provided with the imaged information arithmetic section 80. The imaged information arithmetic section 80 is made up of an infrared rays filter 80a, a lens 80b, an image 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights forward the monitor 34. Accordingly, by providing the infrared rays filter 80a, it is possible to image the image of the markers 340m and 340n more accurately. The lens 80b condenses the infrared rays passing thorough the infrared rays filter 80a to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "Imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data for each fourth predetermined time. It should be noted that a description of the process in the image processing circuit 80*d* is made later.

Figure 5:
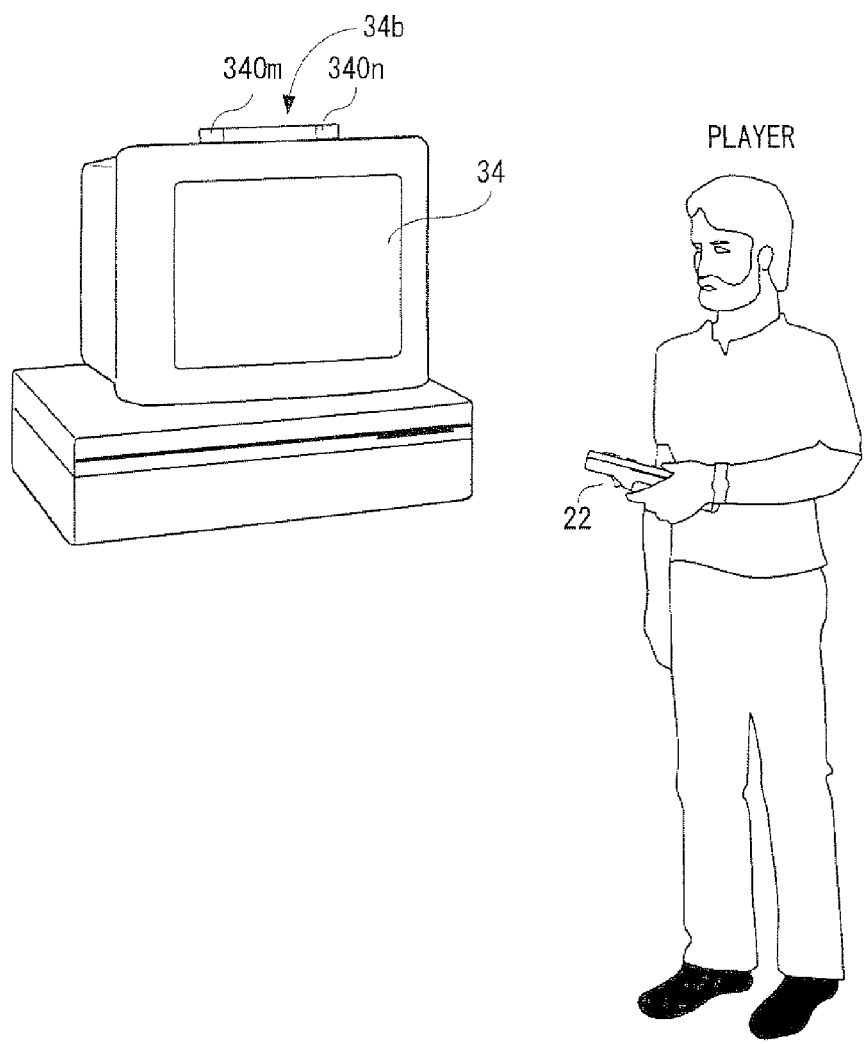
FIG. 5 is an illustrative view summarizing a state in which a game is played by means of the controller shown in FIG. 1.

FIG. 5 is an illustrative view summarizing a state when a player plays a game by utilizing the controller 22. It should be noted that the same is true for a case that another application is executed as well as a game playing. As shown in FIG. 5, when playing the game by means of the controller 22 in the video game system 10, the player holds the controller 22 with one hand. Strictly speaking, the player holds the controller 22 in a state that the front end surface (the side of the incident light opening 22*d* of the light imaged by the imaged information arithmetic section 80) of the controller 22 is oriented to the markers 340*m* and 340*n*. It should be noted that as can be understood from FIG. 1, the markers 340*m* and 340*n* are placed in parallel with the horizontal direction of the screen of the monitor 34. In this state, the player performs a game operation by changing a position on the screen indicated by the controller 22, and changing a distance between the controller 22 and each of the markers 340*m* and 340*n*.

Figure 6:
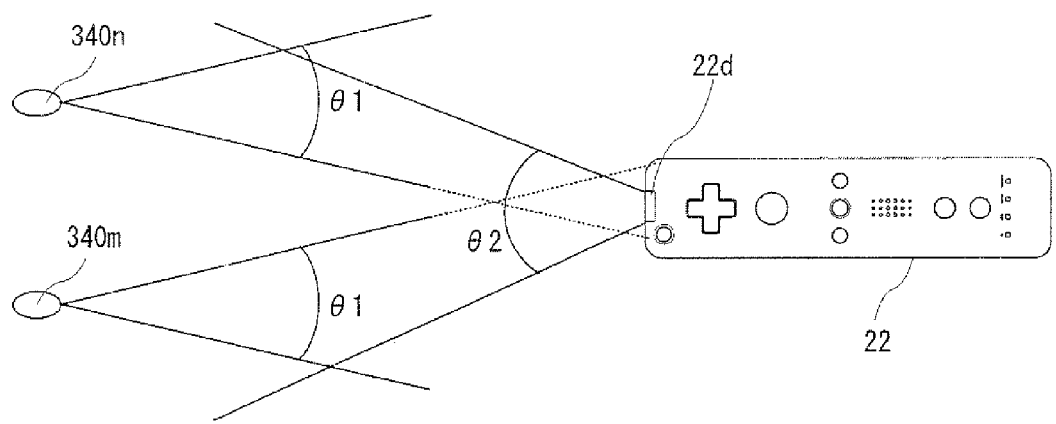
FIG. 6 is an illustrative view showing viewing angles of markers and the controller shown in FIG. 1.

FIG. 6 is a view showing viewing angles between the respective markers 340*m* and 340*n*, and the controller 22. As shown in FIG. 6, each of the markers 340*m* and 340*n* emits infrared ray within a range of a viewing angle $\theta 1$. Also, the imager 80*c* of the imaged information arithmetic section 80 can receive incident light within the range of the viewing angle $\theta 2$ talking the line of sight of the controller 22 as a center. For example, the viewing angle $\theta 1$ of each of the markers 340*m* and 340*n* is 34° (half-value angle) while the viewing angle $\theta 2$ of the imager 80*c* is 41°. The player holds the controller 22 such that the imager 80*c* is directed and positioned so as to receive the infrared rays from the markers 340*m* and 340*n*. More specifically, the player holds the controller 22 such that at least one of the markers 340*m* and 340*n* exists in the viewing angle $\theta 2$ of the imager 80*c*, and the controller 22 exists in at least one of the viewing angles $\theta 1$ of the marker 340*m* or 340*n*. In this state, the controller 22 can detect at least one of the markers 340*m* and 340*n*. The player can perform a game operation by changing the position and the orientation of the controller 22 in the range satisfying the state.

If the position and the orientation of the controller 22 are out of the range, the game operation based on the position and the orientation of the controller 22 cannot be performed. Hereafter, the above-described range is called an "operable range".

Figure 7:
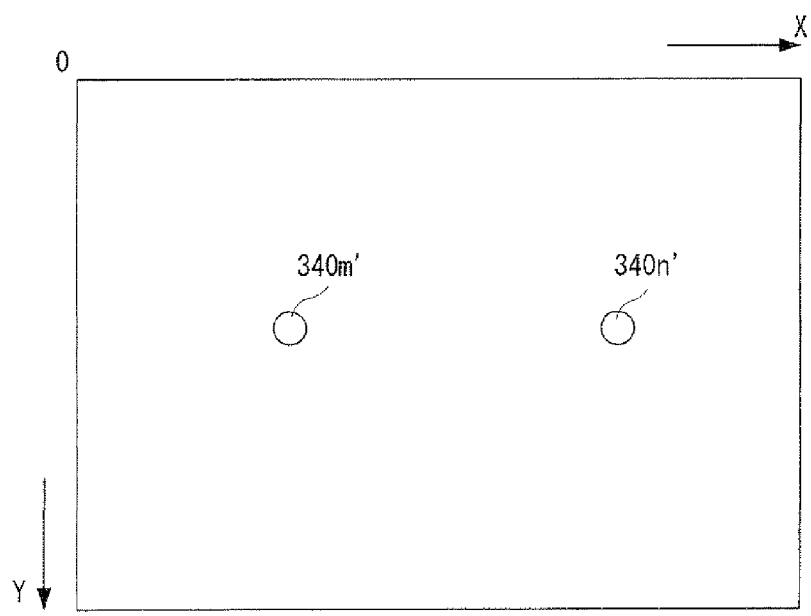
FIG. 7 is an illustrative view showing one example of an imaged image including object images.

If the controller 22 is held within the operable range, an image of each of the markers 340*m* and 340*n* is imaged by the imaged information arithmetic section 80. That is, the imaged image obtained by the imager 80*c* includes an image (object image) of each of the markers 340*m* and 340*n* as an object to be imaged. FIG. 7 is a view showing one example of the imaged image including an object image. The image processing circuit 80*d* calculates coordinates (marker coordinates) indicative of the position of each of the markers 340*m* and 340*n* in the imaged image by utilizing the image data of the imaged image including the object image.

Since the object image appears as a high-intensity part in the image data of the imaged image, the image processing circuit 80*d* first detects the high-intensity part as a candidate of the object image. Next, the image processing circuit 80*d* determines whether or not the high-intensity part is an object image on the basis of the size of the detected high-intensity part. The imaged image may include images other than the object image due to sunlight through a window and light of a fluorescent lamp in the room as well as the images 340*m*' and 340*n*' corresponding to the two markers 340*m* and 340*n* as an object image. The determination processing whether or not the high-intensity part is an object image is executed for discriminating the images 340*m*' and 340*n*' of the two markers 340*m* and 340*n* as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80*d* calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 80*c*. Now, the resolution of the imaged image imaged by the imager 80*c* shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as an object image by the determination process, and therefore, two marker coordinates are calculated. The image processing circuit 80*d* outputs data indicative of the calculated two marker coordinates. The data of the output marker coordinates (marker coordinate data) is included in the input data by the processor 70 as described above, and transmitted to the game apparatus 12.

The game apparatus 12 (CPU 40) detects the marker coordinate data from the received input data to thereby calculate an instructed position (instructed coordinate) by the controller 22 on the screen of the monitor 34 and a distances from the controller 22 to each of the markers 340*m* and 340*n* on the basis of the marker coordinate data. More specifically, from the position of the mid point of the two marker coordinates, a position to which the controller 22 faces, that is, an instructed position is calculated. The distance between the object images in the imaged image is changed depending on the distance between the controller 22 and each of the markers 340*m* and 340*n*, and therefore, the game apparatus 12 can grasp the distance between the controller 22 and each of the markers 340*m* and 340*n* by calculating the distance between the two marker coordinates.

In the game system 10 with such configuration, it is possible to play a game by using a hitting count in a case that at least one word is searched through a predetermined database (hereinafter referred to as a "search hitting count game"). A search hitting count game of this embodiment is explained with reference to the following drawings.

Figure 8:
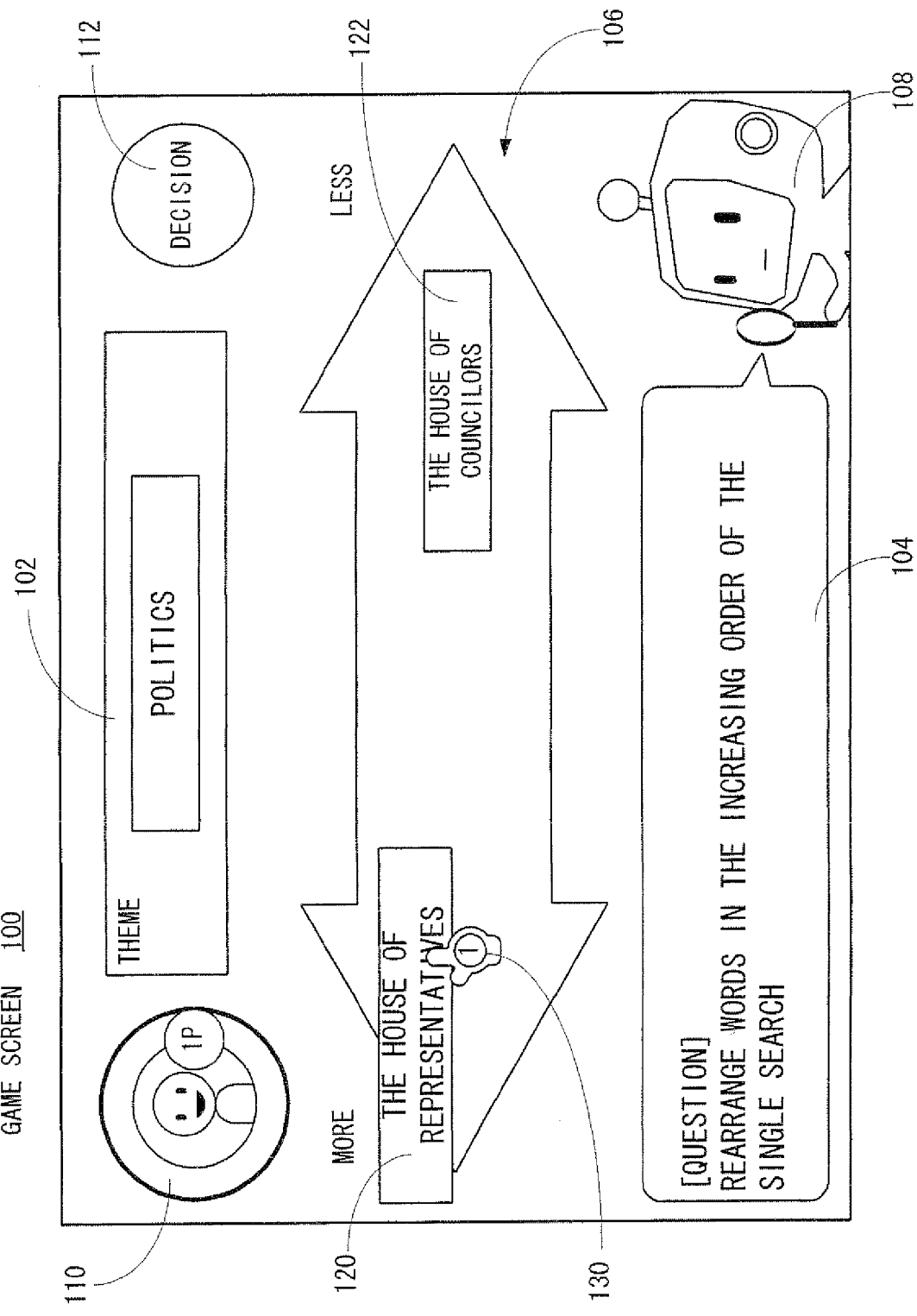
FIG. 8 is an illustrative view showing an example of a game screen of a first game to be displayed on the monitor shown in FIG. 1.

FIG. 8 shows one example of a game screen 100 in a case that a game (for convenience of explanation, referred to as a "first game") is played by using a hitting count (single-search hitting count) obtained as a result of searching through a predetermined database by one word (language). In the game screen 100 shown in FIG. 8, at the upper part, a display area 102 is provided, and at the lower part, a display area 104 is provided. The display area 102 is used for doing a text display of a theme in the first game. Furthermore, the display area 104 is used for doing a text display of a question of the first game. As understood from FIG. 8, the present theme is "politics", and the question is "rearrange the words in the increasing order of the single-search". Also, at the center of the game screen 100, between the display area 102 and the display area 104, a play area 106 for playing a first game is provided. In the play area 106, a tag 120 and a tag 122 are displayed.

Furthermore, at the right of the display area 104, a non player object 108 is displayed such that the non player object 108 talks the content displayed in the display area 104. In addition, at the left of the display area 102, an icon 110 representing a player (first player) is displayed, and at the right of the display area 102, an icon 112 of the decision button is displayed. In addition, on the game screen 100, an instruction image 130 like a mouse pointer is displayed at a position where the player instructs with the controller 22.

In the first game using such a game screen 100, a single-search hitting count of each of words described in a plurality of tags (two in FIG. 8) (120, 122) placed on the play area 106 is predicted, and the tags (120, 122) are arranged in the order of increasing the single-search hitting count (or decreasing order). Each of the tags (120, 122) can be dragged and dropped according to an operation with the controller 22. This holds true hereafter for a case that the player is one.

After completion of rearranging the tags (120, 122), the player turns on (clicks) the icon 112. In the game apparatus 12, it is determined whether or not the tags (120, 122) are arranged in the order of increasing the single-search hitting count. If the tags (120, 122) are arranged in the order of increasing the single-search hitting count, it is determined to be "correct", so that the score is added, and a level of the player is heightened. At this time, that "correct" is determined may be represented by a display of the game screen 100 and an output of a sound (sound effect, background music or BGM), for example. Then, a game screen for showing a next question is displayed. On the other hand, if the tags (120, 122) are not arranged in the order of increasing the single-search hitting count, it is determined to be "incorrect", so that the score is not added, and the level of the player is not heightened. Under certain circumstances, the score is subtracted, and the level of the player is reduced. At this time, that "incorrect" is determined may be represented by a display of the game screen 100 and an output of a sound (sound effect, BGM), for example. Then, a game screen 100 for showing a game over, or selecting whether or not to be challenged again is displayed.

Figure 9:
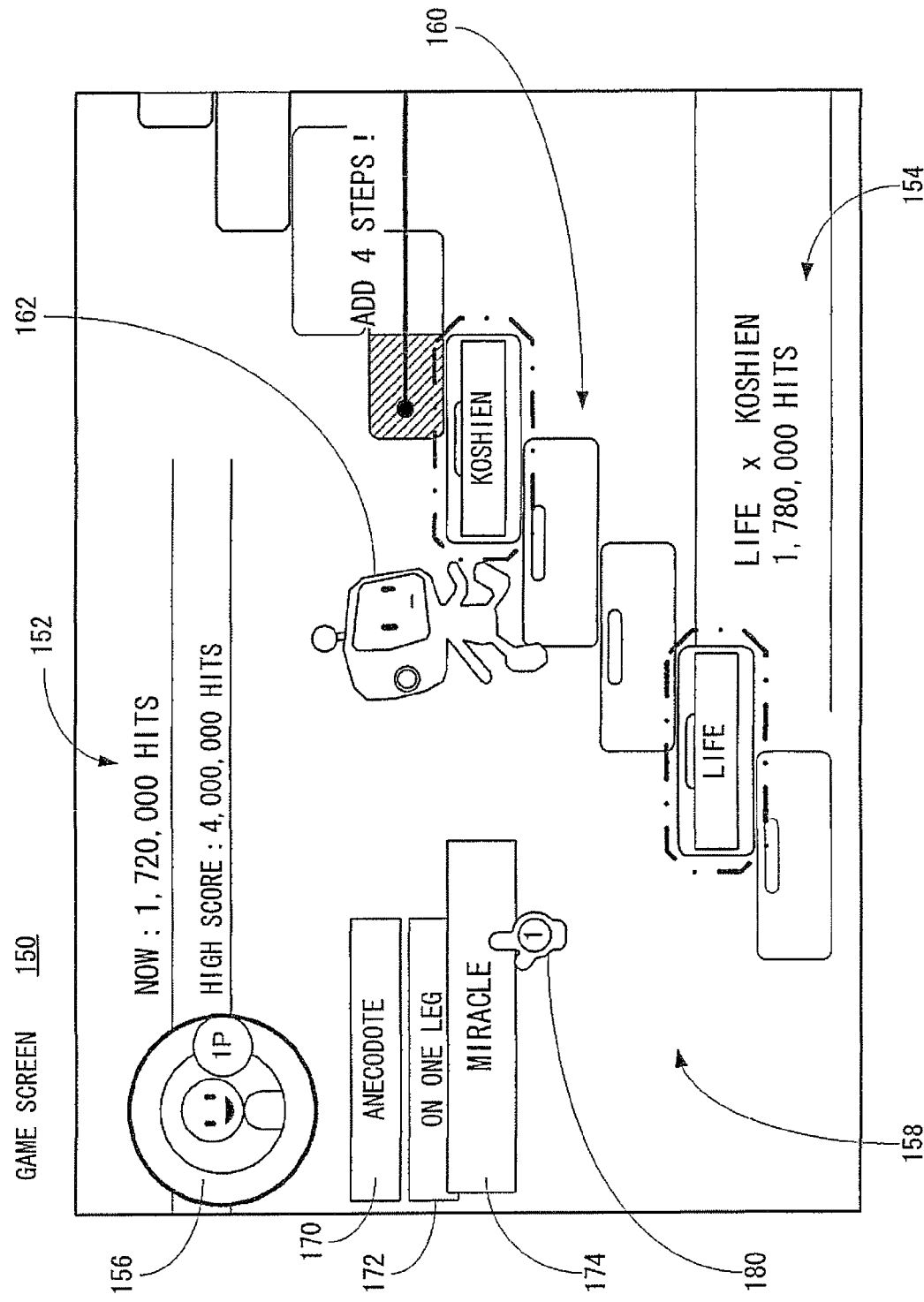
FIG. 9 is an illustrative view showing an example of a game screen of a second game to be displayed on the monitor shown in FIG. 1.

FIG. 9 shows one example of a game screen 150 in a case that a game (for convenience of explanation, referred to as a "second game") is played by using a hitting count (AND search hitting count) obtained as a result of making an AND search through the above-described predetermined database by the combination of two words. On the game screen 150 shown in FIG. 9, at the upper part, a display area 152 is provided, and at the lower part, a display area 154 is provided. At the display area 152, a score of the player (current AND search hitting count and high score) is displayed in text. At the display area 154, an AND search hitting count when an AND search is made by a combination of two words described in the tag the player selected last time and the tag the player selected the time before last, is displayed. Here, when the second game is started, a first word is selected by the game apparatus 12 in advance. Furthermore, at the upper of the game screen 150 and at the left of the display area 152, an icon 156 representing the player (first player) is displayed. In addition, at the center of the game screen 150, between the display area 152 and the display area 154, a play area 158 for playing the second game is provided. At the play area 158, an object of a staircase (staircase object) 160 and the non player object 162 are displayed, and below the icon 156, tags 170, 172, 174 for allowing the player to select a next word are displayed. Furthermore, an instruction image 180 is displayed at a position where the player instructs with the controller 22.

In the second game using such a game screen 150, one word is selected out of the plurality of words (three, for example) (tags 170, 172, 174) placed at the play area 158. That is, any one of the tags 170, 172, 174 is clicked by utilizing the controller 22. Then, an AND search of a combination between the word selected last time (decided in advance by the game apparatus 12 at first) and the word currently selected is executed, and the step of the staircase object 160 is added corresponding to the result (AND search hitting count). As shown in the game screen 150, the non player object 162 moves so as to ascend the staircase object 160. On the other hand, although not illustrated in the game screen 150, the staircase object 160 collapses (is erased) as time advances from the lower step. At a time when the staircase object 160 collapses and the non player object 162 falls, the game is made over. Thus, the player selects a word (tags 170, 172, 174) which is deemed to be more in the AND search hitting count in order that more steps of the staircase object 160 are added as soon as possible.

Here, on the game screen 150 shown in FIG. 9, a result (AND search hitting count) obtained by execution of an AND search by the combination between "life" described in the tag which was selected the time before last and "Koshien" described in the tag which was selected last time is displayed on the display area 154, and thereafter, the player selects "miracle" (tag 174) to display a result of an AND search by the combination "Koshien" and "miracle" at the display area 152 as a current AND search hitting count.

In the second game, in a case that the non player object 162 continues to ascend the staircase object 160 until predetermined tags are used up or a predetermined time elapses, the game is cleared. At this time, that the game is cleared (successful) is represented by a display of the game screen 150 and an output of a sound (sound effect, BGM), for example. On the other hand, in the second game, when the staircase object 160 collapses to make the non player object 162 fall before predetermined tags are used up or a predetermined time elapses, the game is made over. At this time, that the game is over (unsuccessful) is represent by a display of the game screen 150 and an output of a sound (sound effect, BGM), for example.

Figure 10:
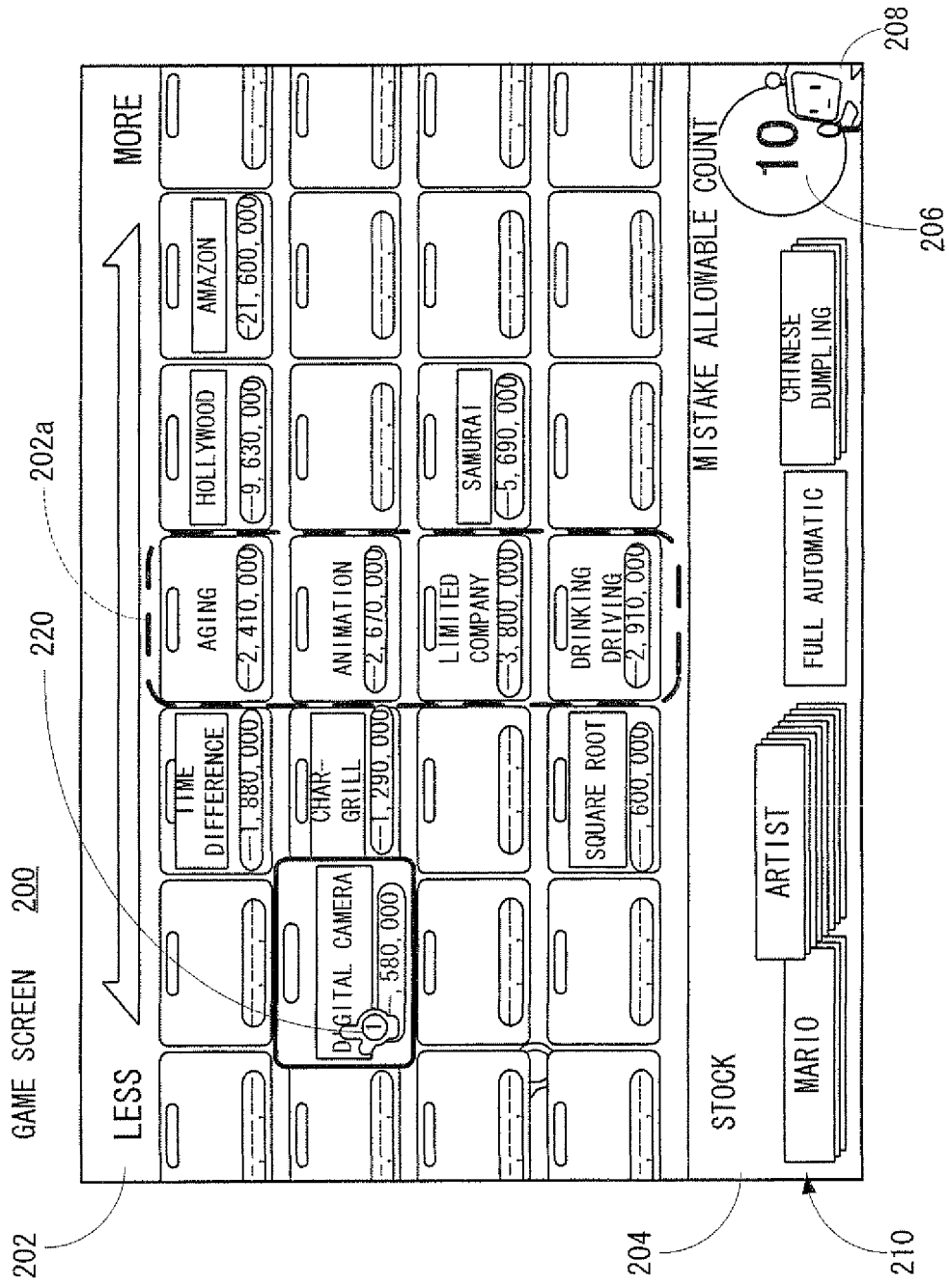
FIG. 10 is an illustrative view showing an example of a game screen of a third game to be displayed on the monitor shown in FIG. 1.

FIG. 10 shows one example of a game screen 200 in a case that another game (for convenience of explanation, referred to as a "third game") is played by using the AND search hitting count. On the game screen 200 shown in FIG. 10, two play areas 202, 204 are provided. In the example shown in FIG. 10, the play area 202 is an area for arranging (displaying) cards on the board, and at a start of the game, only four fixed cards on the board enclosed by the dotted frame 202a is displayed. Furthermore, at the play area 204, an area for displaying a stock (a plurality of tags 210) is displayed. At the play area 204, moreover, a display area 206 for displaying a remaining-mistake-allowable count (wrong-card-touchable count) is provided, and in the vicinity thereof, a non player object 208 is displayed. An instruction image 220 is displayed at a position where the player instructs with the controller 22.

In the third game by utilizing such a game screen 200, the player selects one card of the stock (tag 210) arranged at the play area 204, and arranges the selected tag 210 at the play area 202 by drag and drop. In this third game, there is a rule for arranging the tag 210 like arranging a tag from the frames at both adjacent sides to the fixed cards on the board in order. Furthermore, in the third game, the card on the board (tag 210) have to be arranged such that the AND search hitting count as to the combination between the two words described in the fixed card on the board existing in the same column and the card on the board (tag 210) that the player arranges is increased toward the right direction, and decreased toward the left direction. When the player thus arranges the card on the board (tag 210) to use up all the stocks (tag 210), the game is cleared. On the other hand, before all the stocks (tag 210) are used up, if the remaining-mistake-allowable count becomes 0, or if the player reaches the deadlock, the game is over. In this embodiment, in a case that the AND search hitting count is not arranged in order, that is, if the magnitude relation is reversed, it is determined that a mistake is made, and the remaining-mistake-allowable count is subtracted by one. At this time, the card on the board (tag 210) is returned to the original position. In addition, when the cards on the board are aligned in a row, the cards on the board (tag 210) except for the fixed cards on the board are erased from the game screen 200, to make it possible to arrange other cards on the board (tag 210) at the column. Here, the AND search hitting count as to the AND search by the combination between each of the word described in the cards on the board (tag 210) arranged on the play area 202 and each of the words on the fixed cards on the board is described in the frame corresponding to the tag 210. Furthermore, as to the fixed cards on the board, a single-search hitting count is described.

Figure 11:
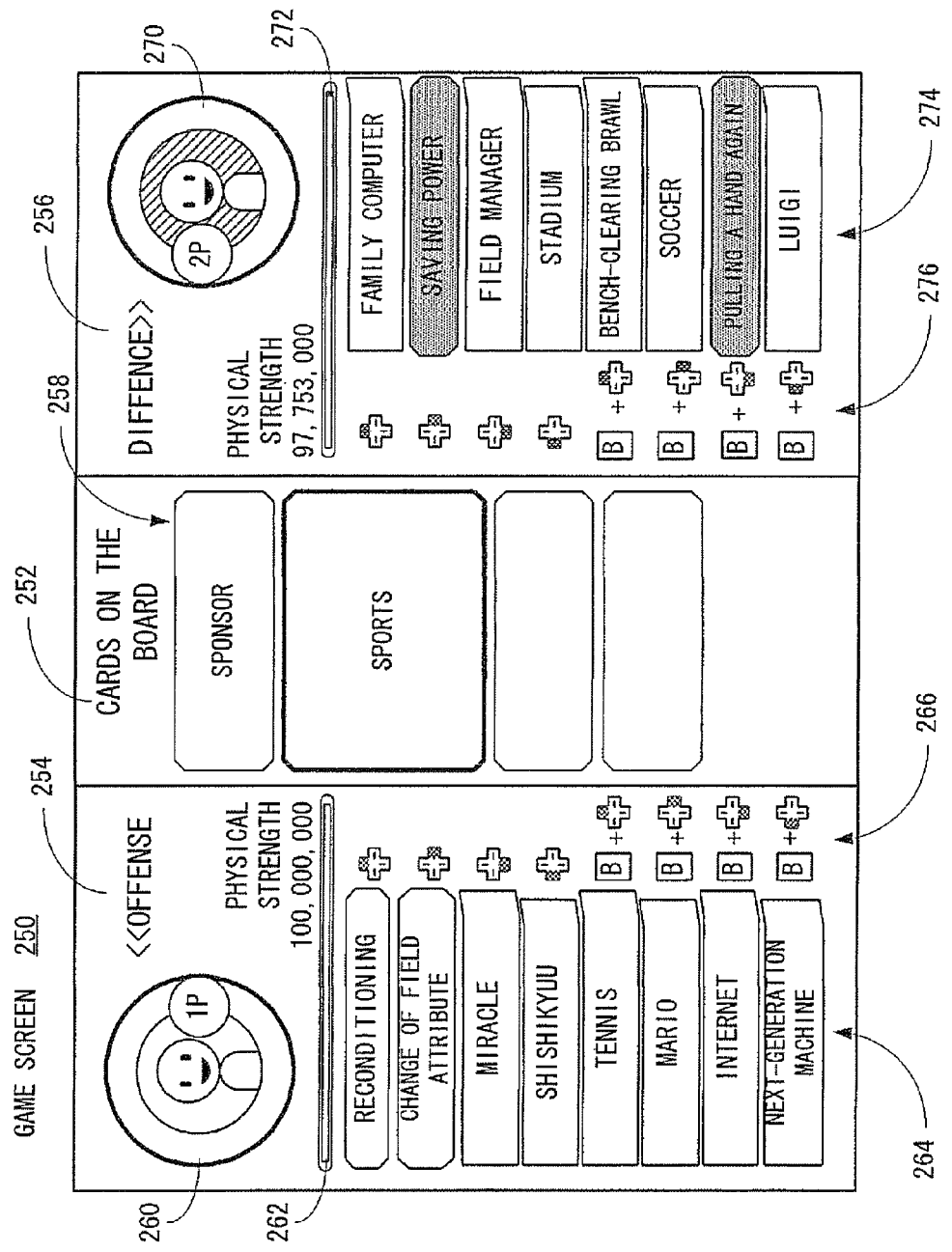
FIG. 11 is an illustrative view showing an example of a game screen of a fourth game to be displayed on the monitor shown in FIG. 1.

FIG. 11 shows one example of a game screen 250 of a game (for the sake of convenience of description, referred to as a "fourth game") which two players (one of them may be a computer player) play by using the AND search hitting count. On the game screen 250 shown in FIG. 11, three display areas 252, 254, 256 which are vertically divided are provided. In the display area 252, cards on the board 258 are displayed. Here, the current card on the board 258 is represented by a heavy-line frame, and displayed so as to become larger than other cards on the board 258 (on an enlarged scale).

At the display area 254, an icon 260 representing a first player is displayed at the upper part, and an indicator 262 representing a physical strength value, a plurality of hands 264 and an operation method 266 of the controller 22 for selecting each hand are displayed below the icon 260. Similarly, at the display area 256, an icon 270 representing a second player is displayed at the upper part, and an indicator 272 representing a physical strength value, a plurality of hands 274 and an operation method 276 of the controller 22 for selecting each hand are displayed below the icon 270.

In the fourth game using such a game screen 250, a battle is made by changing a defensive side and an offensive side in turn between the first player and the second player. The first player and the second player respectively select the hands 264, 274 by a button operation of the controller 22. When the hands 264, 274 are selected, the AND search hitting counts as to the AND search by the combination between the words of the selected hands 264, 274 and the word of the card on the board 258 are obtained. When the AND search hitting count on the offensive side is above the AND search hitting count on the defensive side, the physical strength value on the defensive side is subtracted by a numerical value corresponding to the exceeded hitting count. When the AND search hitting count on the offensive side is equal to or less than the AND search hitting count on the defensive side, the physical strength value on the defensive side is not changed. Then, the player whose physical strength value becomes equal to or less than zero first loses.

It is needless to say that in the fourth game shown in FIG. 11, the hands 264, 274 are selected not by a click operation by means of an instruction image but by only the button operation so as not to show player's design. That is, by performing an operation (button operation) shown by the operation methods 266, 276, it is possible to select a corresponding word. Furthermore, it is possible to select a special action such as "saving power", "pulling a hand again", etc. within the game as well as selection of the word.

Figure 12:
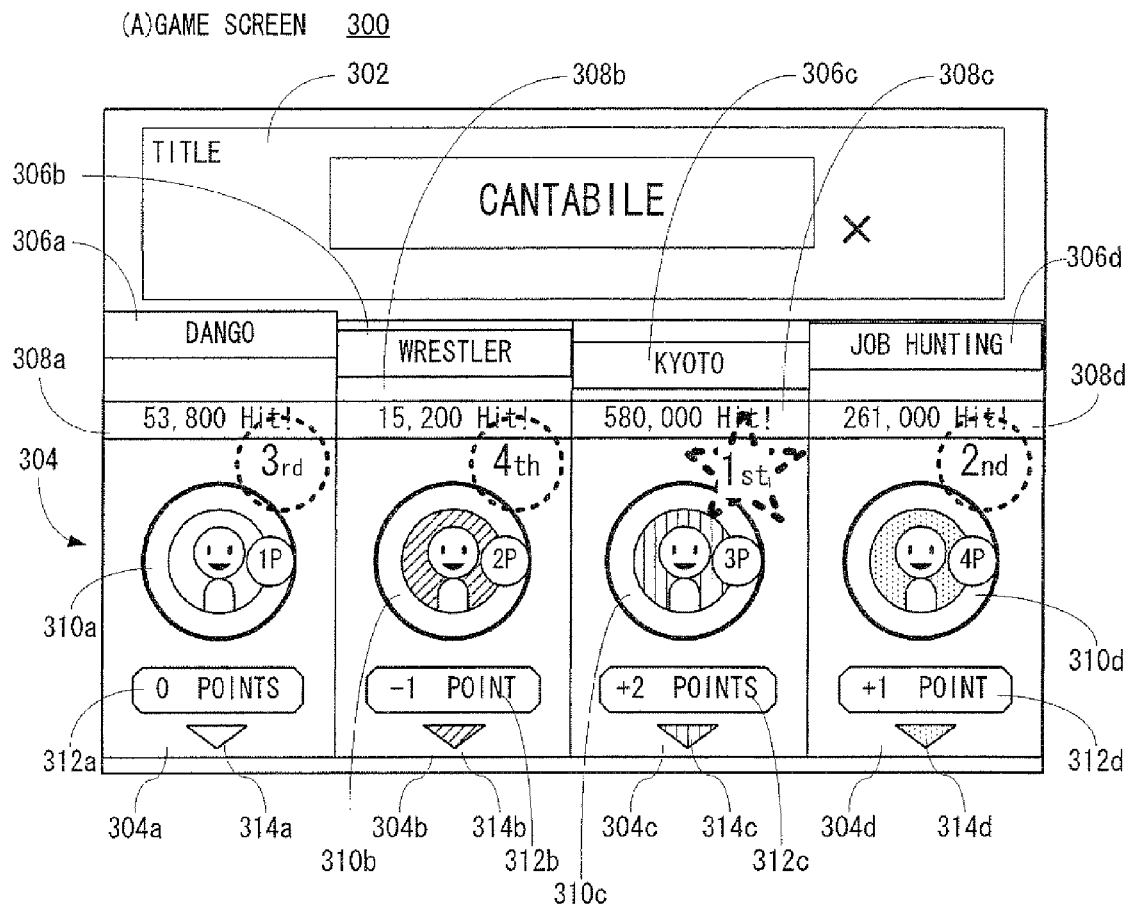
FIG. 12 is an illustrative view showing an example of a game screen of a fifth game to be displayed on the monitor shown in FIG. 1.
Figure 12:
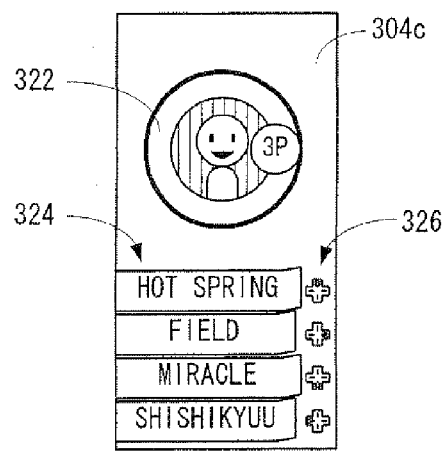

FIG. 12(A) shows one example of a game screen 300 of a game (for the sake of convenience of descriptions referred to as a "fifth game") which four players (one to three players may be computer players) play by means of the AND search hitting count. On the game screen 300 shown in FIG. 12(A), two display areas 302, 304 horizontally divided are provided. At the display area 302, the word of the title ("cantabile" here) are displayed. The display area 304 includes four display areas 304a, 304b, 304c, 304d vertically divided. At the display area 304a, a hand 306a selected by the first player is displayed at the upper part thereof, and a display area 308a for displaying an AND search hitting count is provided below it. Furthermore, below the display area 306a, at the approximately center of the display area 304a, an icon 310a for representing the player (first player) is displayed, a display area 312a representing a score is displayed below the icon 310a, and a button image 314a is displayed further below it.

Although detailed explanation is omitted, this holds true for other display areas 304b, 304c, 304d.

Furthermore, when each of the button images 314a, 314b, 314c, 314d is turned on at each of the display areas 304a, 304b, 304c, 304d, a hand selection screen 320 as shown in FIG. 12(B) is displayed on each of the display areas 304a, 304b, 304c, 304d. The hand selection screen 320 shown in FIG. 12(B) is displayed at the display area 304c in a case that the button image 314c of the display area 304c is turned on. As understood from FIG. 12(B), on the hand selection screen 320, hands 324 are displayed below the icon 322 indicating the player, and an operation method 326 of the controller 22 for selecting each hand 324 is displayed.

In the fifth game by means of such a game screen 300, each player selects the hand 324 describing a word for making all AND search with the word as a title with reference to the hand selection screen 320. Then, AND search hitting counts of the respective players are fetched, and scores are added to the respective players in order of increasing the AND search hitting count. In this embodiment, as to the player which is the most AND search hitting count, that is, the player of the first place (the third player, here), the score is added by two points. To the player of the second place (the fourth player, here), the score is added by one point. To or from the player of the third place (the first player, here), the score is not added or subtracted. From the player of the fourth place (the second player, here), the score is subtracted by one point. If the title is changed in turn, and the score of any player reaches the ten points, for example, the game is to be ended, and the final ranking is decided according to the scores at that time.

Although detailed explanation is omitted, the hand 324 is supplied for each use, and each player can select a sheet of hand 324 from the four sheets of hand 324.

Figure 13:
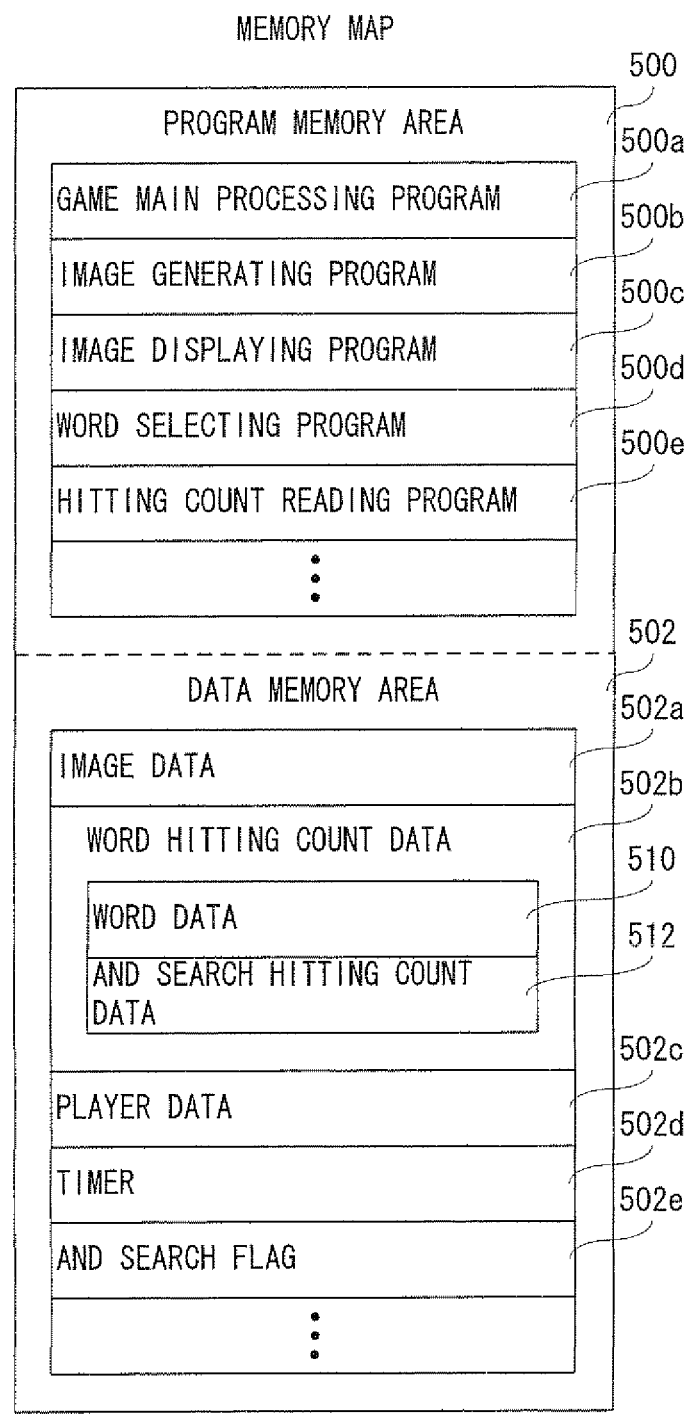
FIG. 13 is an illustrative view showing a memory map of a main memory of the game apparatus in FIG. 1.

FIG. 13 shows an illustrative view showing a memory map of the internal main memory 42e or the external main memory 46 shown in FIG. 2. As shown in FIG. 13, the main memory 42e (46) includes a program memory area 500 and a data memory area 502. The program memory area 500 includes a game program, and the game program is constructed by a game main processing program 500a, an image generating program 500b, an image displaying program 500c, a word selecting program 500d, a hitting count reading program 500e, etc.

The game main processing program 500a is a program for executing main processing of a virtual game (search hitting count game, such as the first game to fifth games) of this embodiment. The image generating program 500b is a program for generating a game image to display the game screen (100, 150, 200, 250, 300, etc.) on the monitor 34 by utilizing image data 502a (polygon data, texture data, etc.) described later. The image displaying program 500c is a program for displaying the game image generated according to the image generating program 500b on the monitor 34. The word selecting program 500d is a program for selecting a word to search a single-search hitting count and an AND search hitting count according to an operation by the player. The hitting count reading program 500e is a program for reading numerical value data of the single-search hitting count or the AND search hitting count from the word hitting count data 502b as to the word selected according to the word selecting program 500d. Here, whether the single-search hitting count or the AND search hitting count is to be read is determined on the basis of an AND search flag 502e described later.

Although illustration is omitted, the game program includes a sound output program, a backup program, etc. The sound output program is a program for outputting a sound necessary for the game, such as a voice or an onomatopoeic sound of a non player object, a sound effect, music (BGM), etc. Furthermore, the backup program is a program for saving game data in a memory card attached to the external connector for memory card 62.

The data memory area 502 stores the image data 502a, word hitting count data 502b, player data 502c, etc. Furthermore, the data memory area 502 has a timer 502d and the AND search flag 502e.

The image data 502a is data for generating a game image, and includes polygon data, texture data, etc. The word hitting count data 502b is data as to a word and a search hitting count. The word hitting count data 502b is constructed by word data 510 and AND search hitting count data 512.

As shown in FIG. 14(A), the word data 510 is data as to a word text string, a single-search hitting count and an attribute which are corresponding to a word ID. The word ID is represented by merely serial numbers (1, 2, 3, . . . , n (n is a maximum value)) in this embodiment, but may be character strings using two or more letters of at least any one of alphabetic characters and numbers. The word text string is data as to notation (kanji character, hiragana, katakana, alphabetic characters, etc.) when a word is displayed on the game screen (100, 150, 200, 250, 300). In FIG. 14(A), for simplicity, the word text string is alphabetic characters of three letters, but in reality, the data of the word shown in the above-described game screen (100, 150, 200, 250, 300) are stored. The single-search hitting count is numerical value data as to a hitting count ($X_n$) in a case that the predetermined database of this embodiment is searched by utilizing only the word. The attribute is data as to various information ($Z_n$) relating to the word. For example, as an attribute, information that a corresponding word is katakana and information on a field (genre, category, etc.) to which the corresponding word belongs are relevant. For example, as to words belonging to a plurality of genres, a plurality of genres are described as an attribute, such as "kumo (cloud, spider)", "hashi (bridge, chopsticks)", "ame (rain, candy)". Furthermore, in a case that a baseball team name of a professional baseball is described as a word, information whether the team belongs to Central League or Pacific League is described.

Additionally, as shown in FIG. 14(B), the AND search hitting count data 512 is data, indicating a numerical value of the AND search hitting count as to the combination of the two words, shown in the table. As understood from FIG. 14(B), the AND search is not required to be made between the same words, and is in relation to the combination between the two words, and therefore, the AND search hitting counts to be stored may be half. That is, since the AND search hitting counts when the line and the column are changed are not stored, this is represented by horizontal lines in FIG. 14(B).

Here, in this embodiment, the game program and the data (image data 502a, word hitting count data 502b) are read from the optical disk 18. This is because that the game apparatus 12, which is even in the environment of not being connected to a network, such as the internet (offline), is allowed to play the virtual game (first game-fifth games, etc.) of this embodiment. Here, the game program and the data may be read from a memory card in place of the optical disk 18. Or, the game program and the data may be downloaded. In addition, the game program and the data can be updated by downloading.

Figure 15:
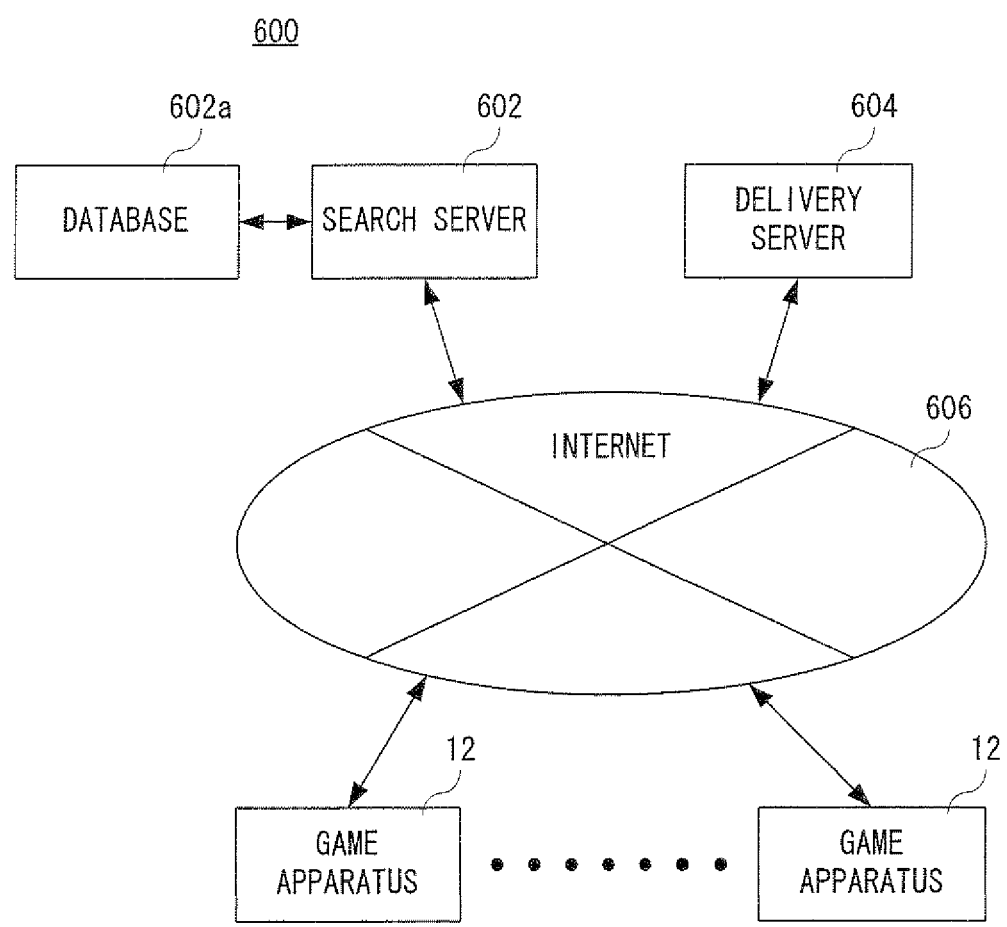
FIG. 15 is an illustrative view showing an example of configuration of a game system including the game apparatus shown in FIG. 1.

For example, it is conceivable that a system 600 as shown in FIG. 15 is constructed. The system 600 shown in FIG. 15 includes a search server 602, and the search server 602 is connected so as to be communicated to a delivery server 604 and a plurality of game apparatuses 12 via a network like the Internet 606.

In FIG. 15, the plurality of game apparatuses 12 are shown to be connected to the Internet 606, but the game apparatus 12 to be connected to the Internet 606 may be only one. Furthermore, the search server 602 and the delivery server 604 are general-purpose servers.

The search server 602 includes a predetermined database 602a described above, and it is possible to search through the database 602a by a word or a combination of two or more words by utilizing a general-purpose search engine. The delivery server 604 can deliver a program (game program, etc.) and data (game data, etc.), and delivers the program and data via the Internet 606, automatically or to the game apparatus 12 which intends to be connected.

In this embodiment, the delivery server 604 periodically (each month, for example) accesses the search server 602 to generate (update) word hitting count data 502b (word data 510 and AND search hitting count data 512), and delivers the updated word hitting count data 502b to the game apparatus 12. This is because that every time that database 602a is updated, the single-search hitting count and the AND search hitting count are also updated, and this makes it possible to reflect the updated content on the virtual game. This makes it to possible to make the latest data useable, and make offline at a game playing, which allows the player to play a search game with responses at high speeds as above-described embodiment.

In this embodiment, as shown in FIG. 15, the search server 602 and the delivery server 604 are connected via the Internet 606, but may directly be connected without passing through the Internet 606. Furthermore, in this embodiment, the search server 602 is sometimes accessed by a general-purpose computer such as a PC, and when the search server 602 is accessed by the plurality of game apparatuses 12 at a time, the accesses are centered on the search server 602, and traffic is heavy, resulting in a low response speed, and therefore, the delivery server 604 is separately provided here. However, the search server 602 and the delivery server 604 can be constructed on one server.

Returning to FIG. 13, the player data 502c stores data as to a score of the player, a single-search hitting count, an AND search hitting count, and a total of the hitting counts. However, if the game is played by a plurality of players, data as to a score of the player, a single-search hitting count, an AND search hitting count, and a total of the hitting counts are stored in the data memory area 502 so as to be identified one from another.

The timer 502d counts a time from the start of the game, for example. Furthermore, the AND search flag 502e is a flag for determining whether the single-search hitting count or the AND search hitting count is to be read. The AND search flag 502e is constructed by one-bit register, for example, and when the flag 502e is established (turned on), a data value "1" is set to the register, and when the flag 502e is not established (turned off), the data value "0" is set to the register. In this embodiment, the AND search flag 502e is turned on or off every game, and in the game using the single-search hitting count, the flag 502e is turned off, and in the game using the AND search hitting count, the flag 502e is turned on.

Although illustration is omitted, the data memory area stores other data such as note data, game data, etc., and other timers (counters) and other flags necessary for the game are also provided.

Figure 16:
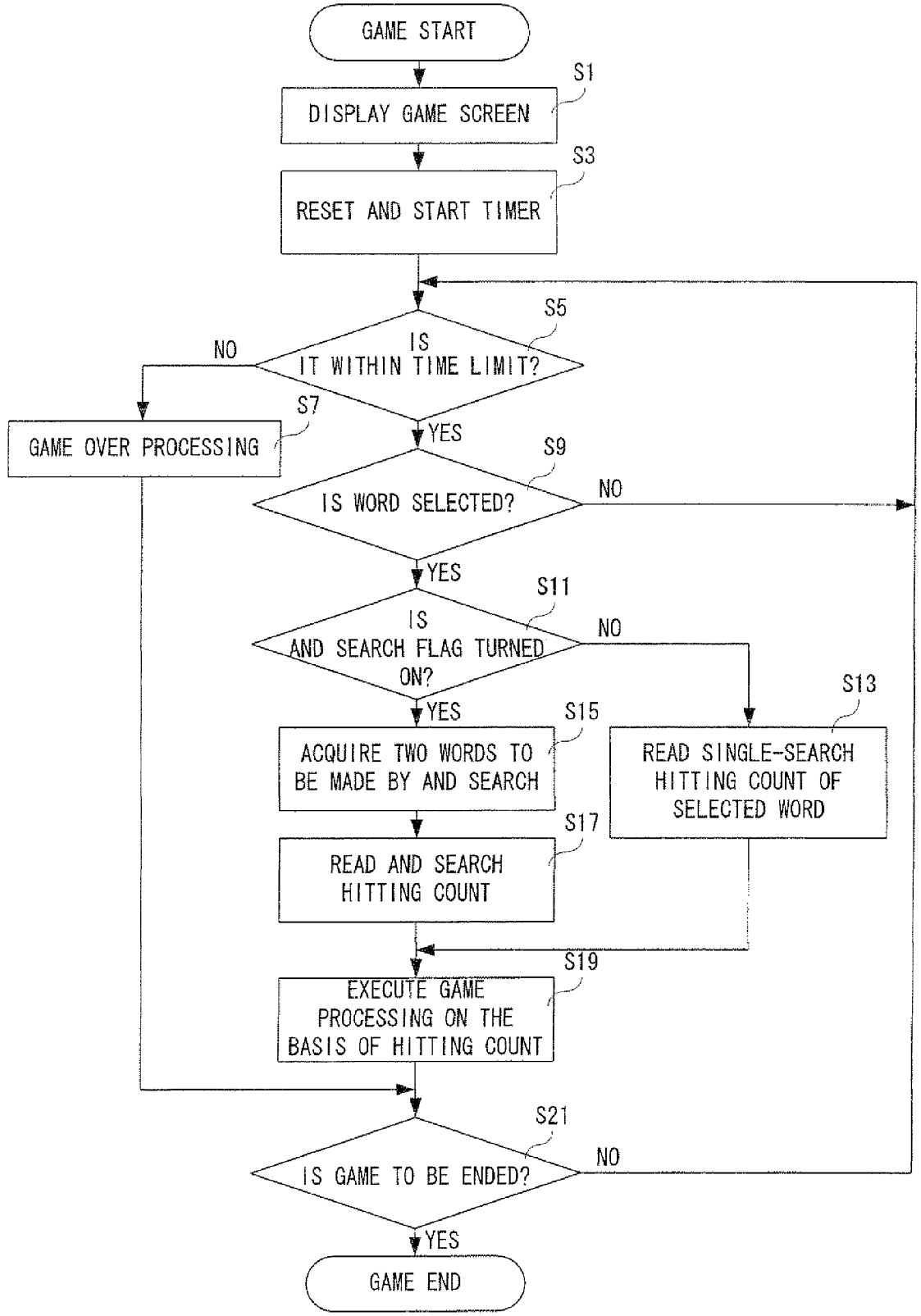
FIG. 16 is a flowchart showing game processing of the CPU shown in FIG. 2.

More specifically, the CPU 40 shown in FIG. 2 executes game processing according to the flowchart shown in FIG. 16. As shown in FIG. 16, the CPU 40 displays a game screen in a step S1 when starting a game. The game screen to be displayed here is an initial screen as to the game like the above-described first to fifth games. In a succeeding step S3, the timer 502d is reset and started. That is, a time from the start of the game is measured.

In a next step S5, it is determined whether or not it is within a time limit, that is, whether or not the time indicated by the count value of the timer 502d is before the time limit. If "NO" in the step S5, that is, if the time indicated by the count value of the timer 502d is after the time limit, game over processing is executed in a step S7, and the process proceeds to a step S21.

However, if whether game over or not is determined not by the time limit, but by the number of mistakes (the number of touching a wrong card), it is determined whether or not the remaining-mistake-allowable count is equal to or less than 0 in the step S5. Then, if the remaining-mistake-allowable count is equal to or less than 0, the game over processing is executed in the step S7. In such a case, in the step S3, in place of processing of resetting and starting the timer 502d, processing of setting the remaining-mistake-allowable count to the initial value is executed. Furthermore, if there is no limitation or restraint on the time limit and mistakes (the number of touching a wrong card), the processes in the steps S3, S5, S7 are not executed.

Alternatively, if "YES" in the step S5, that is, if the time indicated by the count value of the timer 502d is within the time limit, it is determined whether or not a word is selected in a step S9. Depending on the contents of the game, the determination as to whether or not to be selected is different. Here, it is determined whether or not the tag is designated (clicked utilizing the instruction image or subjected to a button operation) by the controller 22, or it is determined whether or not the tag is moved to a predetermined position (drag and drop) by the controller 22. Furthermore, depending on the contents of the game, a plurality of players may play a game as one example, and in such a case, whether or not all of the plurality of players select the words is also determined.

If "NO" in the step S9, that is, if a word is not selected, the process returns to the step S5 as it is. On the other hand, if "YES" in the step S9, that is, if a word is selected, it is determined whether or not the AND search flag 502e is turned on in a step S11. Here, the AND search flag 502e is turned on or off depending on the kind of the virtual game selected prior to starting the game processing.

If "NO" in the step S11, that is, if the AND search flag 502e is turned off, it is determined to be a virtual game using the single-search hitting count, and in a step S13, a single-search hitting count as to the word selected by the player is read from the word data 510, and the process proceeds to a step S19. On the other hand, if "YES" in the step S11, that is, if the AND search flag 502e is turned on, it is determined to be a virtual game using the AND search hitting count, two words to be made by the AND search are acquired in a step S15, that is, the word selected by the player and the word decided in advance in the virtual game so as to be made by the AND search or the word which has already been selected by the player last time are acquired, and in a step S17, an AND search hitting count as to the combination of these two words is read from the AND search hitting count data 512, and then, the process proceeds to the step S19.

In the step S19, game processing based on the single-search hitting count or the AND search hitting count is executed. The game processing is different from the virtual game to the virtual game as described above. Although detailed description is omitted, in the process in the step S19, the game data such as the player data 502c, etc. is also updated. Then, in the step S21, it is determined whether or not the game is to be ended. Here, it is determined whether or not an instruction of the game end is input by the player. If "NO" in the step S21, that is, if the game is not to be ended, the process returns to the step S5 as it is. On the other hand, if "YES" in the step S21, that is, if the game is to be ended, the game processing is ended as it is.

According to this embodiment, since the search hitting count is read from the optical disk and taken from the delivery server so as to be stored in the main memory, during execution of the virtual game, the search processing is not required to be performed in real time by actually utilizing the search server. Thus, even under the environment not being connected to a network like in an offline state, it is possible to enjoy playing the virtual game. Moreover, since there is no need of executing the search processing in real time by utilizing the search server, a communication time with the search server is not required to be taken into account. That is, the response is fast, capable of advancing the game smoothly.

Additionally, in this embodiment, a game apparatus separately provided with the game apparatus and the monitor is only explained, but other game apparatuses, such as a hand-held game apparatus (including a cellular phone having a game function) and an arcade game which are integrally provided with a monitor may be used.

Furthermore, in this embodiment, several kinds of the virtual games are explained, but the game should not be restricted thereto. Other virtual games may be applicable if only the virtual game uses the single-search hitting count and the AND search hitting count.

In addition, in this embodiment, the word hitting count data includes both of the single-search hitting count data and the AND search hitting count data, but in a case that the virtual game using only the single-search hitting count or only the AND search hitting count is played, only one of them may be included.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing data to be used in connection with a game apparatus including at least one processor and a memory, wherein
said game apparatus is configured to perform a game on the basis of a hitting count obtained by searching through a predetermined database by at least one word, and
hitting count data including single-search hitting count data indicating a hitting count obtained by searching through said database by each of a plurality of words and AND search hitting count data indicating a hitting count obtained by an AND search through said database by a combined use of any two words out of said plurality of words are stored prior to the start of said game.

2. A non-transitory storage medium storing a game program, the non-transitory storage medium further storing instructions for performing a game on the basis of a hitting count obtained by searching through a predetermined database by at least one word comprises a hitting count storage location configured to store, prior to the start of said game, together with word data of a plurality of words to be used in said game, hitting count data including single-search hitting count data indicating a hitting count obtained by searching through said database by each of said words and AND search hitting count data indicating a hitting count obtained by an AND search through said database by a combined use of any two words out of said plurality of words, said game program causes a processor to at least:
enable a user to select at least one word,
read the hitting count data from said hitting count storage location on the basis of the selection of the word, and
perform game processing on the basis of the hitting count indicated by said hitting count data.

3. The non-transitory storage medium storing a game program according to claim 2, wherein
said game program causes the computer of said game apparatus to set a time limit for the word selection by the user, and execute the game processing on the basis of the hitting count in relation to the word selected within said time limit.

4. The non-transitory storage medium storing a game program according to claim 2, wherein
said game program causes the computer of said game apparatus to:
enable each of the plurality of users to select at least one word, and
read AND search hitting counts data between a predetermined word presented in advance and the words selected by the respective users, compares them, and execute game processing according to the comparison result.

5. The non-transitory storage medium storing a game program according to claim 2, wherein
said game program causes the computer of said game apparatus to determine whether or not the user arranges a plurality of words in the order of the hitting counts, and execute the game processing according to the determination result.

6. A game data delivery system, comprising:
a search server;
a delivery server; and
at least one game apparatus for performing a game on the basis of a hitting count obtained by searching through a predetermined database by at least one word,
wherein said delivery server includes:
a hitting count acquiring unit configured to acquire a hitting count of said word from said search server via a network,
a delivery data storing unit for producing data of said hitting count from the acquired hitting count and storing it, and
a delivering mechanism configured to deliver said hitting count data stored in said delivery data storing unit to said game apparatus via the network,
said game apparatus includes,
a hitting count storage location configured to store, prior to the start of said game, together with word data of a plurality of words to be used in said game, hitting count data including single-search hitting count data indicating a hitting count obtained by searching through said database by each of said words and AND search hitting count data indicating a hitting count obtained by an AND search through said database by a combined use of any two words out of said plurality of words,
a selecting module configured to enable a user to select at least one word, and
at least one processor in communication with a memory, the at least one processor being configured to read the hitting count data from said hitting count storage location on the basis of the word selection via said selecting module, and being configured to perform game processing on the basis of the hitting count indicated by said hitting count data, wherein
the hitting count data delivered from said delivering mechanism is acquired and stored in said hitting count storage location.

7. A game apparatus for performing a game on the basis of a hitting count obtained by searching through a predetermined database by at least one word, comprising:
a hitting count storage location configured to store, prior to the start of said game, together with word data of a plurality of words to be used in said game, hitting count data including single-search hitting count data indicating a hitting count obtained by searching through said database by each of said words and AND search hitting count data indicating a hitting count obtained by an AND search through said database by a combined use of any two words out of said plurality of words,
a selecting module configured to enable a user to select at least one word, and
at least one processor in communication with a memory, the at least one processor being configured to read the hitting count data from said hitting count storage location on the basis of the word selection via said selecting module, and being configured to perform game processing on the basis of the hitting count indicated by said hitting count data.

8. The game apparatus according to claim 7, wherein
said at least one processor is further configured to set a time limit for the word selection by the user, and execute the game processing on the basis of the hitting count in relation to the word selected within said time limit.

9. The game apparatus according to claim 7, wherein
said selecting module is configured to enable each of the plurality of users to select at least one word, and
said at least one processor is further configured to read AND search hitting counts data of the combinations between a predetermined word presented in advance and the words selected by the respective users, compare them, and execute game processing according to the comparison result.

10. The game apparatus according to claim 7, wherein said at least one processor is further configured to determine whether or not the user arranges a plurality of words in the order of the hitting counts, and execute the game processing according to the determination result.

11. The game apparatus according to claim 7, wherein the hitting count storage location is further configured to store an attribute associated with each said word.

12. The game apparatus according to claim 11, wherein each said attribute represents a field to which its associated word belongs.

13. The game apparatus according to claim 12, wherein each said field is a genre or category.

14. The game apparatus according to claim 7, wherein the user is instructed to arrange in a predetermined direction a plurality of selected words so that AND search hitting counts as between a preselected fixed word and the selected words increase along the predetermined direction.

15. The game apparatus according to claim 7, wherein first and second players have respective scores and are instructed to take turns making selections such that, when one of the first and second players makes a selection relative to a preselected fixed word, the score of other player is decreased by an amount corresponding to the AND search hitting count as between the preselected fixed word and the selection.

16. The game apparatus according to claim 7, wherein the hitting count data is accessible during game processing without having to execute a search query at an online search engine during the game.

17. The game apparatus according to claim 7, wherein the hitting count storage location is separate from the database.

18. The game apparatus according to claim 7, wherein the hitting count data is periodically refreshed based on information from the database.

* * * * *